United States Patent
Torimoto et al.

(10) Patent No.: US 12,441,938 B2
(45) Date of Patent: Oct. 14, 2025

(54) SEMICONDUCTOR NANOPARTICLES COMPOSED OF AgAuS-BASED MULTICOMPONENT COMPOUND

(71) Applicants: NATIONAL UNIVERSITY CORPORATION TOKAI NATIONAL HIGHER EDUCATION AND RESEARCH SYSTEM, Nagoya (JP); TANAKA KIKINZOKU KOGYO K.K., Tokyo (JP)

(72) Inventors: Tsukasa Torimoto, Nagoya (JP); Tatsuya Kameyama, Nagoya (JP); Mariko Hasegawa, Nagoya (JP); Chie Miyamae, Nagoya (JP); Hiroki Sato, Tsukuba (JP); Yuusuke Ohshima, Tsukuba (JP); Shojiro Kikuchi, Tsukuba (JP)

(73) Assignees: NATIONAL UNIVERSITY CORPORATION TOKAI NATIONAL HIGHER EDUCATION AND RESEARCH SYSTEM, Nagoya (JP); TANAKA KIKINZOKU KOGYO K.K., Tokyo (JP)

( * ) Notice: Subject to any disclaimer, the term of this patent is extended or adjusted under 35 U.S.C. 154(b) by 0 days.

(21) Appl. No.: 18/835,465

(22) PCT Filed: Jan. 30, 2023

(86) PCT No.: PCT/JP2023/002840
§ 371 (c)(1),
(2) Date: Jan. 24, 2025

(87) PCT Pub. No.: WO2023/149392
PCT Pub. Date: Aug. 10, 2023

(65) Prior Publication Data
US 2025/0163320 A1    May 22, 2025

(30) Foreign Application Priority Data
Feb. 3, 2022  (JP) .................. 2022-015989

(51) Int. Cl.
*C09K 11/62*   (2006.01)
*C01G 7/00*    (2006.01)
(Continued)

(52) U.S. Cl.
CPC ............ *C09K 11/621* (2013.01); *C01G 7/006* (2013.01); *C09K 11/025* (2013.01);
(Continued)

(58) Field of Classification Search
CPC ...... C09K 11/582; C09K 11/62; C09K 11/584
See application file for complete search history.

(56) References Cited

U.S. PATENT DOCUMENTS 8,889,469 B2    11/2014 Jackrel et al.
2005/0145853 A1  7/2005 Sato et al.
(Continued)

FOREIGN PATENT DOCUMENTS

CN    112536047 A    3/2021
EP    3 591 026 A1   1/2020
(Continued)

OTHER PUBLICATIONS

Feng. Hydrothermal Cation Exchange Enabled Gradual Evolution of Au@ZnS—AgAuS Yolk-Shell Nanocrystals and Their Visible Light Photocatalytic Applications. Adv. Sci. 2018, 5, 1700376 pp. 1-7 (Year: 2018).*

(Continued)

*Primary Examiner* — Matthew E. Hoban
(74) *Attorney, Agent, or Firm* — Foley & Lardner LLP

(57) ABSTRACT

The present invention relates to a semiconductor nanoparticle composed of a compound containing Ag, Au, S and a (Continued)

metal M as essential constitutional elements. In the present invention, the metal M is at least any of Al, Ga, In, Tl, Zn, Cd, Hg and Cu, and the compound has a total content of Ag, Au, S and the metal M of 95 mass % or more. In addition, a ratio (x/(x+y)) of the number of atoms of Ag to a sum of the number of atoms of Ag, x, and the number of atoms of Au, y, in the AgAuS-based multicomponent compound is preferably 0.50 or more and 0.88 or less. The semiconductor nanoparticle of the present invention has appropriate emission and extinction characteristics and is biocompatible.

14 Claims, 16 Drawing Sheets

(51) Int. Cl.
  *C09K 11/02* (2006.01)
  *C09K 11/58* (2006.01)
  *B82Y 20/00* (2011.01)
  *B82Y 40/00* (2011.01)

(52) U.S. Cl.
  CPC .......... *C09K 11/582* (2013.01); *C09K 11/584* (2013.01); *B82Y 20/00* (2013.01); *B82Y 40/00* (2013.01); *C01P 2002/54* (2013.01); *C01P 2002/70* (2013.01); *C01P 2002/85* (2013.01); *C01P 2004/04* (2013.01); *C01P 2004/64* (2013.01); *C01P 2004/80* (2013.01); *C01P 2006/40* (2013.01); *C01P 2006/60* (2013.01)

(56) References Cited

U.S. PATENT DOCUMENTS

| | | |
|---|---|---|
| 2007/0065665 A1 | 3/2007 | Sato et al. |
| 2012/0267605 A1 | 10/2012 | Zhang et al. |
| 2017/0022413 A1 | 1/2017 | Torimoto et al. |
| 2017/0267924 A1 | 9/2017 | Kuwabata et al. |
| 2021/0040385 A1* | 2/2021 | Kuwabata .............. C01G 15/00 |
| 2021/0234056 A1 | 7/2021 | Miyanaga et al. |
| 2023/0165026 A1 | 5/2023 | Torimoto et al. |
| 2023/0247846 A1* | 8/2023 | Wang ..................... C09K 11/88 252/301.4 R |

FOREIGN PATENT DOCUMENTS

| | | |
|---|---|---|
| EP | 3 922 604 A1 | 12/2021 |
| JP | 2004-243507 A | 9/2004 |
| JP | 2004-352594 A | 12/2004 |
| JP | 2017-014476 A | 1/2017 |
| JP | 2018-044142 A | 3/2018 |
| TW | 201324826 A | 6/2013 |
| WO | WO-2020/054764 A1 | 3/2020 |
| WO | WO-2021/182412 A1 | 9/2021 |
| WO | WO2022156467 * | 7/2022 |

OTHER PUBLICATIONS

Office Action issued in corresponding Taiwanese Patent Application No. 112103669 dated Sep. 4, 2024 (11 pages).
International Searching Authority, "International Search Report," issued in connection with International Patent Application No. PCT/JP2023/002840, dated Mar. 28, 2023.
International Searching Authority, "Written Opinion," issued in connection with International Patent Application No. PCT/JP2023/002840, dated Mar. 28, 2023.
European Extended Search Report issued in corresponding European Patent Application No. 23749708.6 dated Apr. 25, 2025.

* cited by examiner

| EXAMPLE 1 | EXAMPLE 2 | EXAMPLE 3 | EXAMPLE 4 | REFERENCE EXAMPLE |
|---|---|---|---|---|
|  |  |  |  |  |
| AVERAGE PARTICLE DIAMETER: 3.7±0.6 nm | AVERAGE PARTICLE DIAMETER: 3.1±0.5 nm | AVERAGE PARTICLE DIAMETER: 3.3±0.5 nm | AVERAGE PARTICLE DIAMETER: 4.3±0.6 nm | AVERAGE PARTICLE DIAMETER: 5.4±1.3 nm |

SEMICONDUCTOR NANOPARTICLES COMPOSED OF AgAuS-BASED MULTICOMPONENT COMPOUND

BACKGROUND OF THE INVENTION

Field of the Invention

The present invention relates to a semiconductor nanoparticle composed of a AgAuS-based multicomponent compound, particularly to a semiconductor nanoparticle composed of a AgAuS-based multicomponent compound composed of Ag, Au, S and a metal M and having a novel configuration.

Description of the Related Art

Semiconductors develop a quantum confinement effect when being composed of nano-scale fine particles and have a band gap based on the particle diameters. Therefore, the adjustment of the band gap by controlling the composition and particle diameters of semiconductor nanoparticles allows emission wavelengths or absorption wavelengths to be arbitrarily set. Semiconductor nanoparticles for which this characteristic is used are also called quantum dots (QDs) and are expected to be used in a variety of technical fields.

For example, for the semiconductor nanoparticles, studies are underway regarding responses to light-emitting elements and fluorescent substances that are used for display devices, marker substances for detecting bio-related substances and the like. In addition to the fact that the emission wavelengths can be freely controlled by controlling the particle diameters as described above, the semiconductor nanoparticles have an emission peak width that is sufficiently narrow compared with those of organic dyes and are stabler under excitation light irradiation than organic dyes. These facts make it possible to expect application to light-emitting elements and the like.

In addition, the semiconductor nanoparticles are also expected to be used in photoelectric conversion elements or light-receiving elements, which are mounted in solar cells, light sensors and the like. In addition to the absorption wavelengths that can be controlled by the particle diameters, the semiconductor nanoparticles have characteristics of a high quantum efficiency and a high extinction coefficient. These characteristics make it possible for the semiconductor nanoparticles to contribute to the size reduction and thickness reduction of semiconductor devices.

In addition, known semiconductor nanoparticles in terms of specific configurations are those composed of a binary compound semiconductor such as CdS, CdSe, CdTe, PbS, PbSe, and a group 11-group 16 compound semiconductor such as $Ag_2S$, or a ternary compound semiconductor such as a group 11-group 13-group 16 compound semiconductor, such as $AgInTe_2$ (Patent Documents 1 to 4).

PRIOR ART DOCUMENT

Patent Document

Patent Document 1
   Japanese Patent Application Laid-Open No. 2004-243507
Patent Document 2
   Japanese Patent Application Laid-Open No. 2004-352594
Patent Document 3
   Japanese Patent Application Laid-Open No. 2017-014476
Patent Document 4
   International Publication No. WO 2020/054764

SUMMARY OF THE INVENTION

Problem to be Solved by the Invention

Semiconductor nanoparticles that are being applied to a variety of the above-described uses are still in a research stage, and the optimum is not yet found, including the producing methods. Under such circumstances, there are a number of requests for the development of nanoparticles to which a novel compound semiconductor having peculiar characteristics attributed to the quantum confinement effect and having characteristic in consideration of a practical aspect such as biocompatibility (low-toxic composition) is applied.

The present invention has been made against a background of the above-described circumstances and discloses a semiconductor nanoparticle that has emission and extinction characteristics as an optical semiconductor, satisfies biocompatibility or the like and is composed of a compound having a novel composition that does not exist in previous report examples. In addition, the present invention provides a semiconductor nanoparticle capable of exhibiting further improved optical semiconductor characteristics based on this novel semiconductor nanoparticle.

Solution to Problem

In a process for solving the above problem, the present inventors paid attention to the usefulness of a semiconductor nanoparticle composed of a AgAuS ternary compound, which is a ternary compound composed of Ag, Au and S, as a novel compound semiconductor that serves as a basis.

In previous research examples regarding semiconductor nanoparticles, it is known that each of Ag and Au separately serves as a constitutional element of semiconductor nanoparticles, but there have been no study examples regarding characteristics when a ternary compound semiconductor containing both Ag and Au has been made into a nanoparticle. Regarding this fact, Ag and Au are both metals that are chemically relatively stable and have been thus far known as biocompatible metals. In addition, S is an essential element of living bodies and is a biocompatible element. Therefore, a semiconductor nanoparticle composed of a AgAuS ternary compound can also be expected to be applied to fluorescent substances for living bodies and the like such as markers. In addition, it is of great significance to study this compound as long as the AgAuS-based compound semiconductor exhibits optical semiconductor characteristics equal to or greater than those of the related art.

Therefore, the present inventors studied, as preliminary studies of the present invention, the manufacturability of the semiconductor nanoparticle composed of the AgAuS-based compound and optical semiconductor characteristics thereof. As a result, the present inventors found that the semiconductor nanoparticle composed of the AgAuS ternary compound can be produced by a well-known wet reduction method as a method for producing the compound nanoparticle. In addition, in the studies by the present inventors, it has been confirmed that the nanoparticle of the AgAuS ternary compound shows the same optical semiconductor characteristics as conventional semiconductor nanoparticles, for example, a $Ag_2S$ nanoparticle. From these studies, the present inventors found that the semiconductor nanoparticle composed of the AgAuS ternary compound is useful as a novel semiconductor nanoparticle.

However, in the preliminary studies, it has been suggested that there is room for enhancement even for the nanoparticle of the AgAuS ternary compound. According to the present inventors, the AgAuS ternary compound shows the same optical semiconductor characteristics, such as quantum efficiency, as the $Ag_2S$ nanoparticle, but the $Ag_2S$ nanoparticle does not exhibit very high performance. In addition, as described above, examples of a field where the use of the semiconductor nanoparticle is expected include light receiving elements, such as an optical sensor, and the like. In recent years, photoresponsive characteristics in the near-infrared range has been emphasized for light receiving elements for a sensor. From $Ag_2S$, performance degradation in the near-infrared range is observed, and there is a concern that the AgAuS ternary compound may be also liable to show the same characteristics. That is, for the AgAuS ternary compound, it is deemed that there is a need of enhancement in improvement in the quantum efficiency, performance improvement in the long wavelength region or the like.

Therefore, the present inventors performed additional studies regarding improvement in the optical semiconductor characteristics of the AgAuS ternary compound, consequently found that, when the semiconductor nanoparticle of the AgAuS ternary compound is made into a nanoparticle composed of a multicomponent compound by adding a predetermined metal element (M) thereto, characteristic enhancement is observed from the AgAuS ternary compound, which serves as a basis, and obtained an idea of the present invention.

The present invention for solving the above problem is a semiconductor nanoparticle composed of a compound containing As, Au, S and a metal M as essential constitutional elements, in which the metal M is at least any of Al, Ga, In, Tl, Zn, Cd, Hg and Cu, and the compound has a total content of Ag, Au, S and the metal M of 95 mass % or more.

Hereinafter, the configuration of a semiconductor nanoparticle composed of a AgAuS-based multicomponent compound semiconductor of the present invention and a production method thereof will be described. In the present specification, a compound that is composed of Ag, Au and S and serves as a basis of the present invention will be referred to as "AgAuS ternary compound" for convenience. In addition, a quaternary or higher compound obtained by adding at least one metal M to the AgAuS ternary compound, which is a subject of the present invention, will be referred to as "AgAuS-based multicomponent compound."

A. Configuration of Semiconductor Nanoparticle of Present Invention

A-1. Chemical Composition of Semiconductor Nanoparticle

As described above, the semiconductor nanoparticle of the present invention is one composed of a AgAuS-based multicomponent compound obtained in which a metal M is added to a AgAuS ternary compound. The metal M that is added for the characteristic enhancement of the AgAuS ternary compound is at least any of Al, Ga, In, Tl, Zn, Cd, Hg and Cu, which are elements belonging to Group 11 elements to Group 13 elements. These metal elements cause an action of improving the emission quantum efficiency of the AgAuS ternary compound or a characteristic change such as a shift of the absorption wavelength. The metal M is more preferably In, Cu, Zn and Ga.

The structure or characteristics of the AgAuS-based multicomponent compound that configures the semiconductor nanoparticle of the present invention are changed depending on the kind or content of the metal M. The content of the metal M in the compound is preferably set to 1 at % or more and 40 at % or less. At less than 1 at %, the AgAuS ternary compound does not substantially change. In addition, at more than 40 at %, the characteristic enhancement effect in terms of the quantum efficiency or the like significantly reduces. In a case where the metal M is an element belonging to Group 13 elements, the content of the metal M is preferably set to 1 at % or more and 21 at % or less.

In addition, the characteristics of the AgAuS ternary compound that serves as the basis of the AgAuS-based multicomponent compound that is employed in the present invention vary with the abundance ratio between Ag and Au in the compound. The characteristics of the nanoparticle composed of the AgAuS-based multicomponent compound of the present invention also vary with the abundance ratio between Ag and Au in the compound. In the present invention, the ratio ($x/(x+y)$) of the number of atoms of Ag to the sum of the number of atoms of Ag($x$) and the number of atoms of Au ($y$) in the compound is preferably 0.50 or more and 0.88 or less. The lower limit value of the ratio of the number of atoms of Ag is more preferably set to 0.63 or more and still more preferably set to 0.71 or more. The upper limit of the ratio of the number of atoms of Ag is preferably set to 0.87. Within these composition ranges, an effect of increasing the emission quantum efficiency or the like becomes clear.

In addition, S is also an essential constitutional element in the AgAuS-based multicomponent compound. S is a constitutional element of the AgAuS ternary compound, which serves as the basis, and is contained in the AgAuS-based multicomponent compound also by charge compensation during the addition of the metal M. Therefore, the content of S changes depending on the kind (valency) or content of the metal M. The content of S in the AgAuS-based multicomponent compound is preferably 30 at % or more and 60 at % or less. The content of S is more preferably 35 at % or more and 45 at % or less.

The semiconductor nanoparticle of the present invention is composed of the AgAuS-based multicomponent compound containing Ag, Au, S and the metal M as the essential constitutional elements. In this AgAuS-based multicomponent compound, the total content of Ag, Au, S and the metal M is 95 mass % or more. As an element that is possibly contained other than Ag, Au, S and the metal M, which are the essential constitutional elements, Ge, Si, Sn, Pb, O, Se, Te or the like can be considered, and these elements are permitted as long as the content thereof is less than 5 mass %. In the compound, the total content of Ag, Au, S and the metal M is preferably 99 mass % or more and more preferably 99.9 mass % or more. The composition value of the compound here is the value of the AgAuS-based multicomponent compound that configures the semiconductor nanoparticle, and a component of a protective agent, which will be described below, is not included.

A-2. Structure of Semiconductor Nanoparticle

Regarding the structure of the AgAuS-based multicomponent compound that configures the semiconductor nanoparticle of the present invention, the distribution state of each atom of Ag, Au, S and the metal M, which are the essential constitutional elements, is not particularly limited. Examples of the structure of the compound that configures the semiconductor nanoparticle include compounds in a state where the metal M has been doped into the AgAuS ternary compound containing Ag, Au and S. Doping in this case refers to the substitution and/or interstitial penetration of the metal M atom into the crystal lattice of the semiconductor crystals composed of the AgAuS ternary compound.

In addition, the compound that configures the semiconductor nanoparticle of the present invention has a so-called core-shell structure in some cases. In this case, the compound has a structure in which the AgAuS ternary compound containing Ag, Au and S forms a compound that becomes the core (core compound) and a compound containing the metal M or essentially containing the metal M and containing at least any of Ag, Au and S forms the shell (shell compound) and coats at least a part of the surface of the core compound. Regarding the semiconductor nanoparticle having the core-shell structure, it is considered that the metal M in the shell modifies a surface defect of the AgAuS ternary compound that becomes the core, which leads to the characteristic improvement of the AgAuS ternary compound. In this case, the shell compound may be composed of the metal M alone, may be composed of a compound containing the metal M and at least any of Ag, Au and S (for example, $AgMS_2$ or the like) or may be a mixture thereof.

In any of the above-described structures, the element distribution in the AgAuS-based multicomponent compound may be regular or irregular. For example, in a case where the compound has the core-shell structure, the AgAuS ternary compound that forms the core is not always composed of a single phase and may be composed of a mixed phase. Examples of the AgAuS ternary compound that is present in the semiconductor nanoparticle of the present invention include not only compounds with a stoichiometric composition, such as, $Ag_1Au_7S_4$, $AgAu_3S_2$, $Ag_3Au_5S_4$, AgAuS, $Ag_5Au_3S_4$, $Ag_3AuS_2$ and $Ag_7AuS_4$, but also compounds with a composition that is not the stoichiometric composition. The AgAuS ternary compound may be these stoichiometric compositions, may be a composition that is not the stoichiometric composition or may be a mixed phase thereof.

In addition, regarding the structural analysis of the semiconductor nanoparticle of the present invention, a scanning transmission electron microscope (Scanning TEM) can be preferably used. Particularly, according to a high angle annular dark field scanning TEM (HAADF-STEM), it is possible to obtain a scattered image reflecting the composition information of the nanoparticle, and it is possible to ascertain the dispersion states of Ag, Au, S and the metal M and the composition of the entire nanoparticle with a combination with an energy dispersive X-ray spectrometer (EDX) or the like.

The semiconductor nanoparticle of the present invention preferably has an average particle diameter of 2 nm or more and 20 nm or less. The particle diameter of the semiconductor nanoparticle correlates with an action of adjusting the band gap by a quantum confinement effect. The average particle diameter is preferably adjusted to be as described above in order to exhibit preferable emission and extinction characteristics by the adjustment of the band gap. The average particle diameter of the semiconductor nanoparticle can be obtained by observing a plurality of (preferably 100 or more) particles with an electron microscope such as TEM, measuring the particle diameter of each particle and calculating the particle number average.

A-3. Protective Agent of Semiconductor Nanoparticle

In addition, the semiconductor nanoparticle of the present invention preferably has at least any of an alkylamine having 4 to 20 carbon atoms in an alkyl chain, an alkenylamine having 4 to 20 carbon atoms in an alkenyl chain, an alkylcarboxylic acid having 3 to 20 carbon atoms in an alkyl chain, an alkenylcarboxylic acid having 3 to 20 carbon atoms in an alkenyl chain, an alkanethiol having 4 to 20 carbon atoms in an alkyl chain, a trialkylphosphine having 4 to 20 carbon atoms in an alkyl chain, a trialkylphosphine oxide having 4 to 20 carbon atoms in an alkyl chain, triphenylphosphine and triphenylphosphine oxide as the protective agent bonded to the particle surface. Upon handling the semiconductor nanoparticle, it is common to disperse the semiconductor nanoparticle in an appropriate dispersion medium to produce a solution (also referred to as a slurry or ink in some cases). The protective agent suppresses the agglomeration of the semiconductor nanoparticle in the solution to produce a homogeneous solution or the like and is thus useful. In addition, the protective agent is added to a reaction system together with a raw material in the process for synthesizing the AgAuS compound and thereby acts to form nanoparticles having a suitable average particle diameter. As the protective agent, the above-described alkylamine, alkenylamine, alkylcarboxylic acid, alkenylcarboxylic acid, alkanethiol, trialkylphosphine, trialkylphosphine oxide, triphenylphosphine and triphenylphosphine oxide can be applied singly or in combination.

A-5. Optical Semiconductor Characteristics of Semiconductor Nanoparticle

As thus far described, depending on the particle diameter of the semiconductor nanoparticle, the band gap is adjusted by the quantum confinement effect, and the extinction characteristics change. In the semiconductor nanoparticle of the present invention, the absorption edge wavelength of the absorption spectrum on the long wavelength side is preferably 600 nm or more. This makes the semiconductor nanoparticle have absorbency and responsiveness with respect to light from the visible light range to the near-infrared range. As a more preferable aspect, the present invention is capable of providing a semiconductor nanoparticle having an absorption edge wavelength of the absorption spectrum on the long wavelength side of 780 nm or more.

A-6. Usage Aspect of Semiconductor Nanoparticle

The semiconductor nanoparticle of the present invention can be applied to a variety of the above-described uses, such as light-emitting elements, by being applied to and supported by appropriate base materials and carriers. The configurations, shapes and dimensions of these base materials and carriers are not particularly limited. As a plate-like base material or the base material on a foil or film, for example, glass, quartz, silicon, ceramic, metal and the like are exemplified. In addition, as granular or powdery carriers, inorganic oxides such as ZnO, $TiO_2$, $WO_3$, $SnO_2$, $In_2O_3$ and $Al_2O_3$ are exemplified. In addition, the semiconductor nanoparticle may be supported by the inorganic oxide carrier and, furthermore, fixed to the base material.

In addition, at the time when the semiconductor nanoparticle is applied to and supported by the base material and the carrier, it is common to use a solution, a slurry or an ink containing the semiconductor nanoparticle appropriately dispersed in a dispersion medium as described above. As the dispersion medium such as the solution, chloroform, toluene, cyclohexane, hexane and the like can be applied. In addition, it is possible to apply dipping or a spin coating method as a method for applying the solution or the like of the semiconductor nanoparticle and a variety of methods such as a dropping method, an impregnation method and an adsorption method as a method for supporting.

B. Method for Producing Semiconductor Nanoparticle of Present Invention

Next, a method for producing the semiconductor nanoparticle of the present invention will be described. Since the semiconductor nanoparticle of the present invention is composed of the compound obtained by adding the metal M to the AgAuS ternary compound, a first example of the producing method is a producing method including a step of producing a nanoparticle composed of the AgAuS ternary compound and a step of adding the metal M to the AgAuS ternary compound. Hereinafter, a method for producing the AgAuS ternary compound and the step of adding the metal M will be described.

B-1. Step of Producing AgAuS Ternary Compound Nanoparticle

The nanoparticle composed of the AgAuS ternary compound can be produced by mixing a Ag precursor, a Au precursor and, if necessary, a S precursor, which is a sulfur source, with a reaction solvent and heating a reaction system composed of these precursors at a temperature of 100° C. or higher and 200° C. or lower.

As the Ag precursor and the Au precursor, which serve as the raw materials of the AgAuS ternary compound, a Ag salt or a Ag complex and a Au salt or a Au complex are each applied. The Ag precursor and the Au precursor are each preferably a salt or complex containing monovalent Ag or monovalent Au. As the Au precursor, a precursor containing trivalent Au can be used. This is because, in the process for synthesizing the semiconductor nanoparticle, trivalent Au is reduced and turned into monovalent Au due to a solvent, a coexisting sulfur compound or the like. In addition, as at least any of the Ag precursor and the Au precursor, it is preferable to apply a complex having a ligand containing a sulfur(S) atom. In this case, the compound can be synthesized using the sulfur atom that is contained in the ligand of the Ag complex and/or the Au complex as the sulfur supply source of the AgAuS ternary compound.

Examples of a preferable Ag precursor include silver acetate (Ag(OAc)), silver nitrate, silver carbonate, silver oxide, silver oxalate, silver chloride, silver iodide, silver cyanide salt and the like. In addition, examples of a preferable Au precursor include Au resinate ($C_{10}H_{18}Au_2S_2$: CAS 68990-27-2), chloro(dimethylsulfide) gold (I) (($CH_3$)$_2$SAuCl), gold (I) iodide, gold (I) sulfite, chloroauric acid (III), gold (III) acetate, gold (I) cyanide salt, gold (III) cyanide salt, 1,10-phenanthroline gold (III) and the like. In addition, as a sulfur compound that serves as the S precursor, aside from pure sulfur, compounds such as thiourea, alkylthiourea, thioacetamide and alkanethiols and compounds such as β-dithiones, dithiols, xanthates and diethyldithiocarbamate can be applied. Even when the Ag complex or the Au complex is a complex having a ligand containing a S atom, a S compound may be added.

The composition of the AgAuS ternary compound to be synthesized can be adjusted by the mixing ratio between the Ag precursor and the Au precursor (charged atomic ratio). In order to obtain a preferable AgAuS ternary compound, regarding the amount of the Ag precursor charged and the amount of the Au precursor charged, when the atomic ratio between metal atoms that are contained therein (Ag:Au) is expressed as a:b, a:b is preferably set between 0.78:0.22 to 0.14:0.86. In addition, regarding the amount of S in the reaction system, it is preferable to set the atomic ratio to the total number of the atoms of Ag and Au in the reaction system to 0.25 or more and 0.60 or less. Regarding the sulfur source, even when excess S is present in the reaction system, the excess S has a small influence on the composition of the AgAuS ternary compound.

The reaction system in the synthesis of the semiconductor nanoparticle can be generated in the absence of solvent, or a solvent may be used. In the case of using a solvent, it is possible to apply octadecene, tetradecane, oleic acid, oleylamine, dodecanethiol, a mixture thereof or the like.

As described above, the semiconductor nanoparticle of the present invention is preferably a nanoparticle in which the protective agent bonds to the AgAuS-based multicomponent compound. Therefore, it is preferable to add the protective agent to the above-described reaction system together with the Ag precursor, the Au precursor and the like. As the protective agent, it is preferable to add at least any of an alkylamine having 4 to 20 carbon atoms in an alkyl chain, an alkenylamine having 4 to 20 carbon atoms in an alkenyl chain, an alkylcarboxylic acid having 3 to 20 carbon atoms in an alkyl chain, an alkenylcarboxylic acid having 3 to 20 carbon atoms in an alkenyl chain, an alkanethiol having 4 to 20 carbon atoms in an alkyl chain, a trialkylphosphine having 4 to 20 carbon atoms in an alkyl chain, a trialkylphosphine oxide having 4 to 20 carbon atoms in an alkyl chain, triphenylphosphine and triphenylphosphine oxide.

The heating temperature (reaction temperature) of the reaction system composed of the Ag precursor, the Au precursor, the S precursor and the protective agent is set to 50° C. or higher and 200° C. or lower. At lower than 50° C., the synthesis of the AgAuS ternary compound is difficult to proceed. On the other hand, at higher than 200° C., there is a problem of a concern that Au may singly form a nanoparticle and a compound having a desired composition may not be generated. The average particle diameter of the semiconductor nanoparticle increases with an increase in the reaction temperature, but it is not common for the average particle diameter to exceed the preferable average particle diameter as long as the reaction temperature is within the above-described temperature range. A more preferable reaction temperature is 100° C. or higher and 165° C. or lower. In addition, the heating time (reaction time) can be adjusted by the amount of the raw material charge, but is preferably set to one minute or longer and 60 minutes or shorter. During the synthesis reaction of the semiconductor nanoparticle, it is preferable to stir the reaction system.

After the end of the synthesis reaction of the semiconductor nanoparticle, the reaction system is cooled as necessary, and the semiconductor nanoparticle is collected. At this time, the nanoparticle may be precipitated by adding an alcohol (ethanol, methanol or the like), which serves as a nonsolvent, or the semiconductor nanoparticle may be precipitated by centrifugation or the like, collected, furthermore, the particle may be washed once with an alcohol (ethanol, methanol or the like) or the like and then homogeneously dispersed in a good solvent such as chloroform.

B-2. Addition of Metal M to AgAuS Ternary Compound

The metal M can be added to the AgAuS ternary compound in the absence of solvent, but is preferably added in a solvent. As the solvent, it is possible to use the same solvent as that in the reaction system for the AgAuS ternary compound. A reaction system containing the nanoparticle of the AgAuS ternary compound produced above may be used as it is or a reaction system may be formed by collecting the nanoparticle with well-known separation means and then redispersing the nanoparticle in the solvent.

In the step of adding the metal M to the AgAuS ternary compound nanoparticle, a compound of the metal M is added to the reaction system as a metal M precursor and mixed and heated. Examples of the metal M precursor include chlorides, sulfides, nitrates, acetates, sulfates, sulfamates, stearates and the like of the metal M. Examples thereof include indium chloride, indium acetate, indium diethyldithiocarbamate, copper chloride, copper acetate, zinc stearate, zinc acetate and the like. The content of the metal M in the AgAuS-based multicomponent compound of the present invention is adjusted with the amount of the precursor of the metal M in the reaction system.

In addition, a sulfur source is preferably added to the reaction system when the metal M is added. As the sulfur source, aside from pure sulfur, compounds such as thiourea, alkylthiourea, thioacetamide and alkanethiols and compounds such as β-dithiones, dithiols, xanthates and diethyldithiocarbamate are preferable. S may be contained in the compound that serves as the precursor of the metal M; however, even in this case, the S compound that serves as the sulfur source may also be added thereto. In addition, the sulfur source may be a compound containing the metal M and S (for example, tris(diethyldithiocarbamate) indium or the like).

The heating temperature for adding the metal M is preferably set to 80° C. or higher and 200° C. or lower. At lower than 80° C., it is difficult for the doping of the metal M to advance. On the other hand, at higher than 200° C., there is a concern that the decomposition of the AgAuS ternary compound may occur. A more preferable reaction temperature is 100° C. or higher and 150° C. or lower. In addition, the heating time (reaction time) can be adjusted by the amount of each component charged in the reaction system and is preferably set to five minutes or longer and 60 minutes or shorter. The reaction step makes it possible to manufacture a semiconductor nanoparticle composed of the AgAuS-based multicomponent compound obtained by adding the metal M to the AgAuS ternary compound.

Furthermore, in addition to the producing method described above, as a second method for producing the AgAuS-based multicomponent compound particle, the nanoparticle of the AgAuS-based multicomponent compound of the present invention can be produced by a method in which Au or Ag is added to a nanoparticle of a ternary compound of the metal M, Ag or Au and S (AgMS or AuMS). In this case, the nanoparticle of the ternary compound of the metal M, Ag or Au and S (AgMS or AuMS) can be synthesized using precursors containing each element of the above-described Ag, Au, metal M and S. In addition, as a step of adding Au or Ag to the ternary compound of the metal M, Ag or Au and S, the same method as the above-described step of adding the metal A can be applied, which makes it possible to manufacture the nanoparticle of the AgAuS-based multicomponent compound of the present invention.

Advantageous Effects of Invention

As described above, the present invention is a semiconductor nanoparticle composed of a AgAuS-based multicomponent compound obtained by adding a metal M to a AgAuS ternary compound. The AgAuS ternary compound is a novel composition as a configuration component of the semiconductor nanoparticle and exhibits optical semiconductor characteristics by being made into a nanoparticle. In addition, more favorable characteristics are exhibited by adding the metal M such as In to the AgAuS ternary compound.

Since a main constitutional element is a low-toxic biocompatible element, the semiconductor nanoparticle of the present invention can also be expected to be applied not only to ordinary semiconductor devices such as light-emitting elements but also to markers and the like that are used in living bodies.

In addition, the semiconductor nanoparticle of the present invention has improved emission and extinction characteristics in the near-infrared region. As photoelectric conversion elements for which responsiveness in the near-infrared range has been emphasized recently, there are light-receiving elements that are applied to LIDAR (light detection and ranging) or short-wave infrared (SWIR) image sensors. The semiconductor nanoparticle of the present invention is expected to be used in photoelectric conversion elements that operate in such a near-infrared region.

DETAILED DESCRIPTION OF THE PREFERRED EMBODIMENTS

Hereinafter, embodiments of the present invention will be described. In the present embodiments, first, as a preliminary study, semiconductor nanoparticles composed of AgAuS ternary compounds having a variety of compositions were produced with the mixing ratio between a Ag precursor and a Au precursor adjusted. In addition, regarding the produced semiconductor nanoparticles, TEM observation and composition analyses were performed, and then,

[Production of AgAuS Ternary Compound Nanoparticle]

Figure 1:
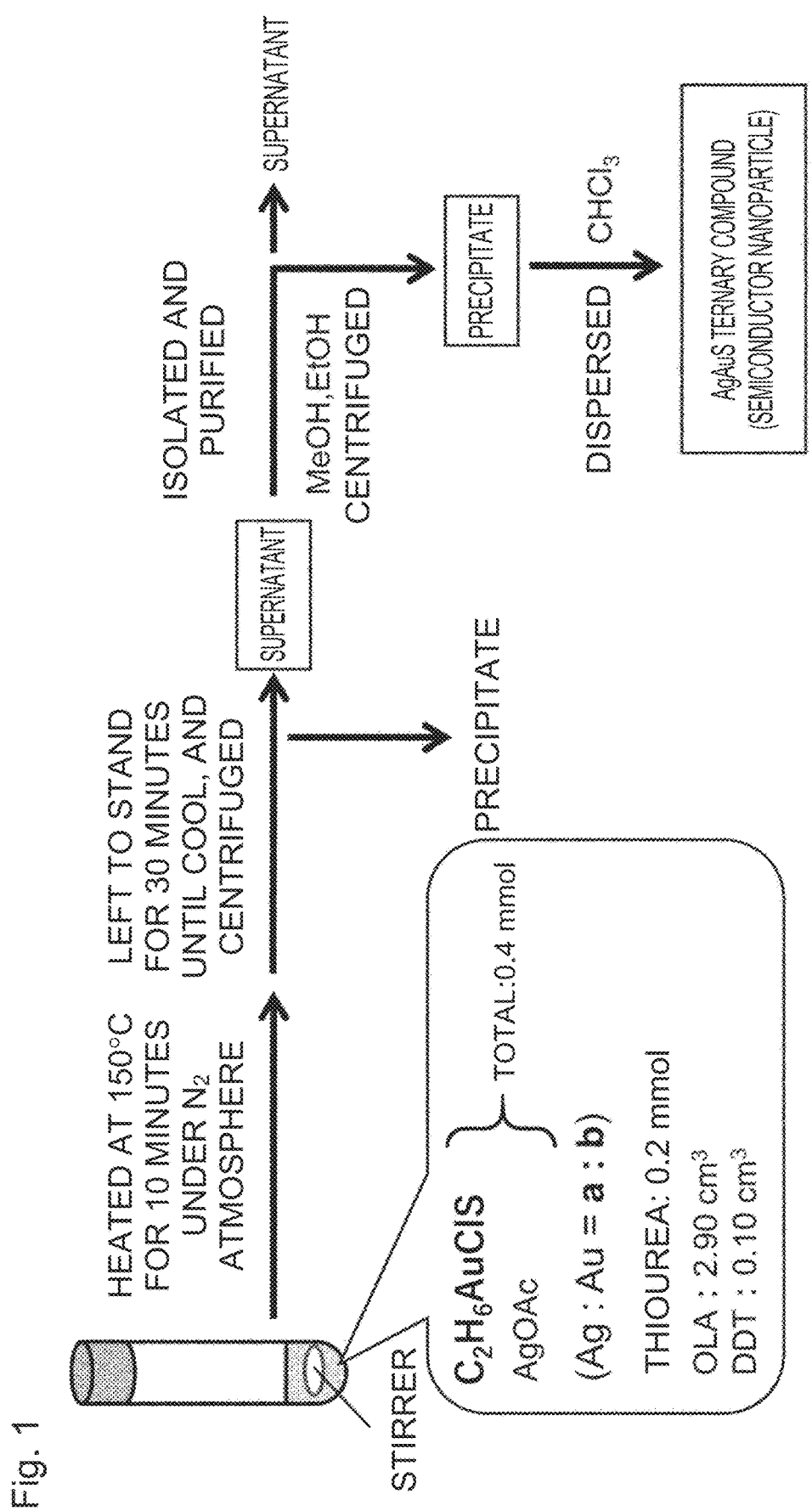
FIG. 1 is a view showing the outline of steps for producing a nanoparticle of a AgAuS ternary compound.

FIG. 1 is a view showing the outline of steps for producing a nanoparticle of a AgAuS ternary compound. As raw materials, silver acetate (Ag(OAc)) as the Ag precursor, chloro(dimethyl sulfide) gold (I) as the Au precursor and thiourea as a S precursor were weighed and put into a test tube, and furthermore, 0.1 cm$^3$ of 1-dodecanethiol (DDT) as a protective agent and 2.9 cm$^3$ of oleylamine (OLA) as a solvent were added thereto.

In this preliminary study, the metal atom charged atomic ratio (Ag:Au=a:b provided that a+b=1.0) of Ag to Au was adjusted while the total amount of Ag and Au, which were the metal atoms contained in the precursors, was maintained at 0.4 mmol. The amount of the thiourea was commonly set to 0.2 mmol. Here, AgAuS ternary compounds were synthesized with seven charged atomic ratios in which the charged ratios of Ag were set to 1.0, 0.88, 0.75, 0.63, 0.5, 0.25 and 0.

Each precursor, the protective agent, the solvent and a stirrer were put into the test tube, substituted with nitrogen three times, and then heated and stirred with a hot stirrer for 10 minutes at a reaction temperature set to 150° C. After the end of a reaction, the components were left to stand for 30 minutes until cool and then transferred to a small test tube, centrifugation was performed at 4000 rpm for five minutes, and a supernatant and a precipitate were separated.

Subsequently, 4 cm$^3$ of methanol was added to the supernatant as a nonsolvent to generate a precipitate, centrifugation was performed at 4000 rpm for five minutes, and the precipitate was collected. Furthermore, this precipitate was dispersed with 4 cm$^3$ of ethanol added thereto, then, centrifugation was performed under the same conditions, and a by-product and the solvent were removed to purify the precipitate.

The precipitate obtained by the above-described operation was dispersed in 3 cm$^3$ of chloroform, thereby obtaining a dispersion liquid of the nanoparticle of the AgAuS ternary compound. This dispersion liquid was transferred to a sample bottle, substituted with nitrogen, shielded from light and stored in a refrigerator.

[TEM Observation and Average Particle Diameter Measurement]

Figure 2:
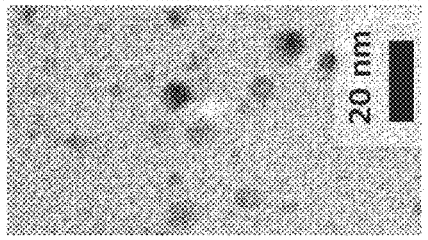
FIG. 2 is TEM images of semiconductor nanoparticles of AgAuS ternary compounds produced in a preliminary study.

On the nanoparticles of the produced AgAuS ternary compounds (the Ag charged ratios a=1.0, 0.88, 0.75, 0.63, 0.5, 0.25 and 0), TEM observation was performed. FIG. 2 shows the TEM images of the nanoparticles of the produced AgAuS ternary compounds (regarding magnifications, refer to a scale bar on each photograph). From each TEM image, it was confirmed that a substantially spherical nanoparticle was synthesized. In addition, based on the TEM image, the average particle diameter of the nanoparticle having each composition was measured and calculated. In the measurement of the particle diameters, particle diameters are obtained from all measurable nanoparticles in the TEM image, and the average particle diameter were calculated.

[Composition Analysis of Nanoparticle]

EDX analysis was performed together with the above-described TEM observation, thereby analyzing the compositions of nanoparticle. The content of each element of Ag, Au and S in the seven nanoparticles in which the charged atomic ratios a of Ag were set to 1.0, 0.88, 0.75, 0.63, 0.5, 0.25 and 0 is shown in Table 1. The results of the composition analyses are displayed in at % with respect to the entire nanoparticle in this preliminary study and each embodiment to be described below. In addition, the ratios (x/(x+y)) of the number of Ag atoms to the sum of the number of Ag atoms (x) and the number of Au atoms (y) that are calculated based on the composition analysis results are also shown in Table 1.

TABLE 1

| No. | Ag charged ratio (a) | Composition (at %) | | | x/(x + y) |
|---|---|---|---|---|---|
| | | Ag | Au | S | |
| 1 | 0.00 | 0.00 | 40.3 | 59.7 | 0.00 |
| 2 | 0.25 | 21.9 | 33.2 | 44.9 | 0.40 |
| 3 | 0.50 | 35.6 | 23.6 | 40.9 | 0.60 |
| 4 | 0.63 | 41.6 | 17.9 | 40.4 | 0.70 |
| 5 | 0.75 | 47.8 | 12.3 | 39.9 | 0.80 |
| 6 | 0.88 | 51.8 | 7.9 | 40.3 | 0.87 |
| 7 | 1.00 | 61.9 | 0.00 | 38.1 | 1.00 |

It is found from Table 1 that the proportions (x/(x+y)) of the number of atoms of Ag in the nanoparticles (AgAuS) produced in the preliminary study of the present embodiment do not completely match the Ag charged ratios (a) of the metal precursor, but are liable to become closer as the Ag charged ratio increases.

[Measurement of Absorption Spectrum and Emission Spectrum]

Next, for the nanoparticle of each AgAuS ternary compound, the absorption spectrum was measured. The absorption spectrum was measured with a UV-Visible spectrophotometer (manufactured by Agilent Technologies International Japan, Ltd., manufactured by Agilent 8453) within a wavelength range of 400 nm to 1100 nm.

In addition, regarding each nanoparticle, an emission spectrum and an emission quantum efficiency were measured. For the emission spectrum, a diode array spectrophotometer (PMA-12, C10027-02) manufactured by Hamamatsu Photonics K.K. was used. The sample was adjusted in a chloroform solution (n=1.4429) so that the absorbance at 365 nm reached 0.1, and the measurement was performed.

In addition, for the measurement of the emission quantum yield, an absolute PL quantum yield spectrometer (manufactured by Hamamatsu Photonics K.K., C9920-03) was used. In a case where emission was observed at a long wavelength of 1000 nm or longer, the emission spectrum was measured with a photonic multichannel analyzer (manufactured by Hamamatsu Photonics K.K., PMA-12 (model Nos.: C10027-02 (wavelength range: 350 to 1100 nm) and 10028-01 (wavelength range: 900 to 1650 nm)). During the measurement, the sample was adjusted in a chloroform solution (n=1.4429) so that the absorbance at 700 nm reached 0.1. The excitation light wavelength was set to 700 nm in the measurement. For the calculation of the emission quantum yield, regarding the emission spectrum measured with the fluorescence spectrophotometer, the emission spectrum of an ethanol solution (n=1.3618) of indocyanine green (ICG: Φ=13.2%), which is a near-infrared emitting organic fluorescent dye, was measured as a standard specimen, and the emission quantum yield of each sample was calculated from the following expression by the comparative method.

$$\Phi_x = \Phi_{st} \times \left(\frac{FA_x}{FA_{st}}\right) \times \left(\frac{A_{st}}{A_x}\right) \times \left(\frac{I_{ex,st}}{I_{ex,x}}\right) \times \left(\frac{n_x^2}{n_{st}^2}\right) \quad \text{[Expression 1]}$$

($A$: Absorbance of specimen at excitation wavelength, $Iex$: Intensity of excitation light at excitation wavelength, $n$: Refractive index of solvent)

Figure 3:
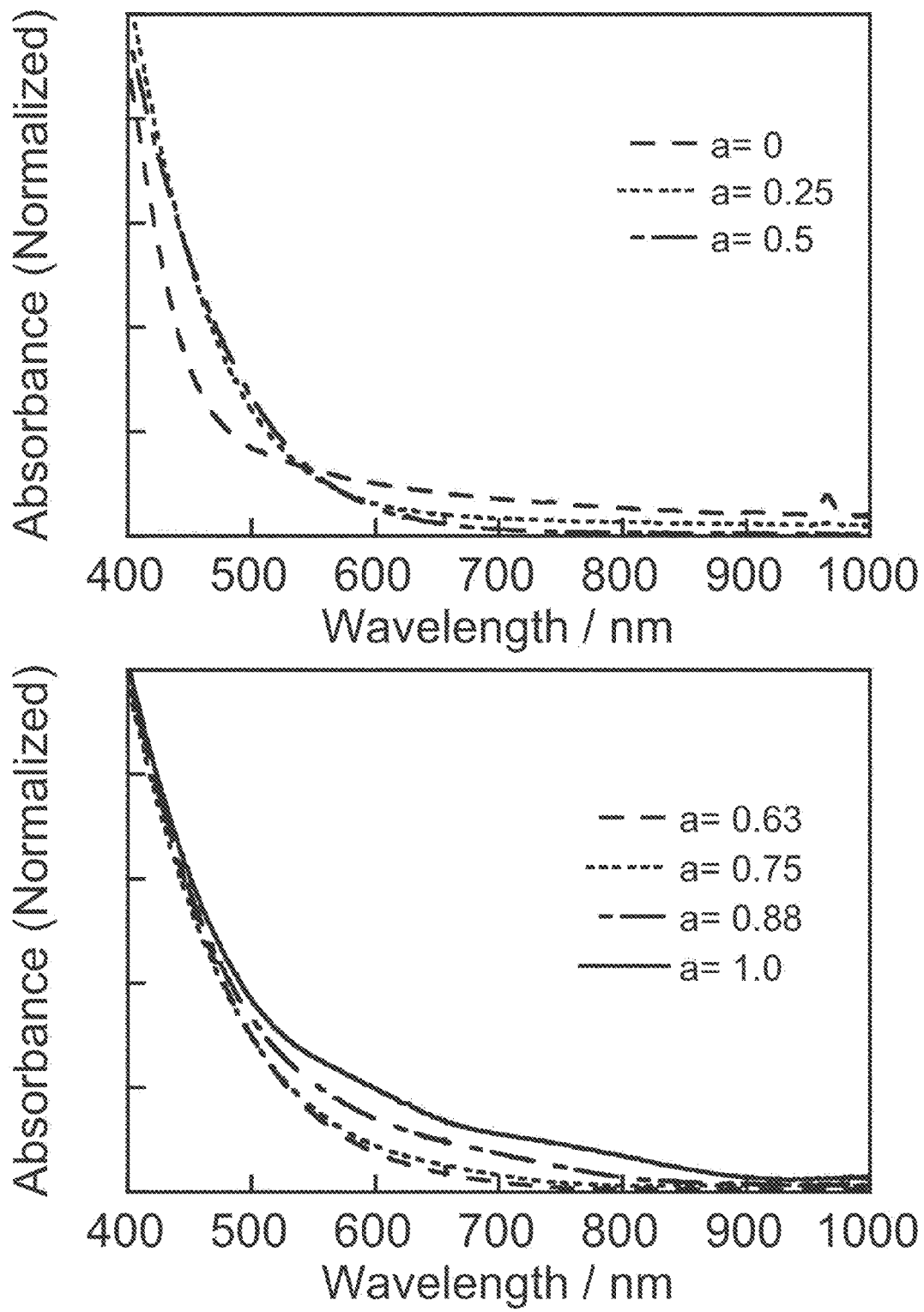
FIG. 3 is measurement results of absorption spectra of the nanoparticles produced in the preliminary study.
Figure 4:
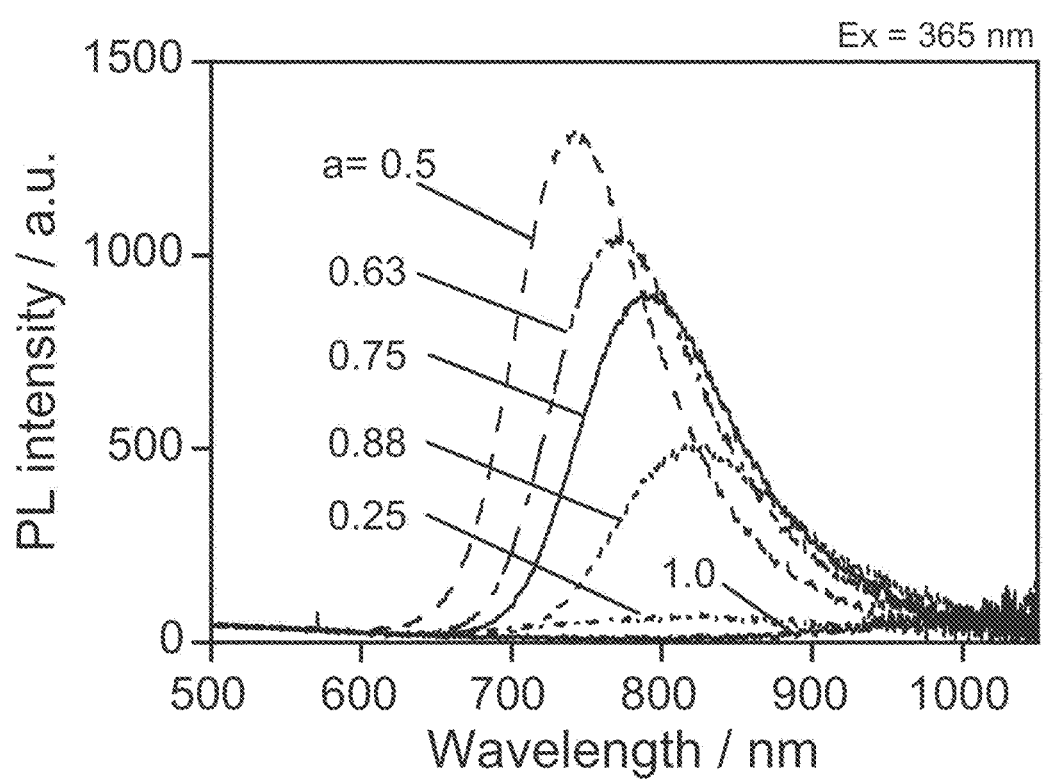
FIG. 4 is measurement results of emission spectra and emission quantum efficiencies of the nanoparticles produced in the preliminary study.

The measurement results of the absorption spectra of the AgAuS ternary compound nanoparticles produced in the preliminary study are shown in FIG. 3. In addition, the measurement results of the emission spectra and the emission quantum efficiencies are shown in FIG. 4. In addition, the relationship among the composition of each nanoparticle, the emission wavelength and the emission quantum efficiency is summarized and shown in Table 2.

TABLE 2

| No. | Ag charged ratio (a) | Composition (at %) | | | x/ (x + y) | λ (nm) | PLQY (%) |
|---|---|---|---|---|---|---|---|
| | | Ag | Au | S | | | |
| 1 | 0.00 | 0.00 | 40.3 | 59.7 | 0.00 | — | 0 |
| 2 | 0.25 | 21.9 | 33.2 | 44.9 | 0.40 | 850 | 1.9 |
| 3 | 0.50 | 35.6 | 23.6 | 40.9 | 0.60 | 740 | 5.3 |
| 4 | 0.63 | 41.6 | 17.9 | 40.4 | 0.70 | 770 | 5.3 |
| 5 | 0.75 | 47.8 | 12.3 | 39.9 | 0.80 | 778 | 4.2 |
| 6 | 0.88 | 51.8 | 7.9 | 40.3 | 0.87 | 818 | 4.8 |
| 7 | 1.00 | 61.9 | 0.00 | 38.1 | 1.00 | 1100 | 1.00 |

Referring to FIG. 3, it is confirmed that the absorption edge wavelengths of the AgAuS ternary compound nanoparticles are all 600 nm or more. Referring further to FIG. 4 and Table 2, it is found that the AgAuS ternary compound nanoparticles all show emission. In addition, relatively high emission quantum efficiencies are exhibited in the nanoparticles having a charged ratio of Ag of more than 0.5 (x/(x+y)=0.6). In addition, it is found that, as the Ag charged ratio increases and the proportion (x/(x+y)) of the number of Ag atoms increases, the emission peak is liable to be shifted in the long wavelength direction (except when a=0.25).

First Embodiment: From the above-described results of the preliminary study, it was confirmed that the nanoparticle composed of the AgAuS ternary compound is capable of exhibiting light-absorptive and light-emitting characteristics as an optical semiconductor material. Based on the results of this preliminary study, semiconductor nanoparticles were produced by adding In as a metal M to the AgAuS ternary compound nanoparticles produced above.

In the present embodiment, In was added to the AgAuS ternary compound nanoparticles where the emission quantum efficiency was relatively high in the preliminary study and the Ag charged ratio was 0.5 or more (No. 3 to No. 6 in Table 1) and the AgS compound nanoparticle having a charged ratio of 1.0, which is for reference, (No. 7). In addition, the same number of atoms of In as the total number of atoms (x+y) of the number of atoms of Ag(x) and the number of atoms of Au (y) that configured the AgAuS ternary compound to which In was to be added were added to the reaction system (the amount of addition equal to the number of atoms of Ag and Au will be referred to as 1 equivalent).

[Addition of Metal M (in) (1 Equivalent)]

The AgAuS ternary compound nanoparticle produced above was fractionated such that the total metal amount of Ag and Au reached $1.23 \times 10^{-5}$ mol and put into a test tube together with $1.23 \times 10^{-5}$ mol of indium chloride (InCl$_3$) and $1.84 \times 10^{-5}$ mol (1.5 equivalents with respect to indium chloride) of thioacetamide, and furthermore, 3.0 cm$^3$ of dehydrated oleylamine was put thereinto as a solvent. In addition, a reaction temperature was set to 110° C. with a hot stirrer, and the components were stirred while being heated for 15 minutes. After the end of a reaction, the components were left to stand for 20 minutes until cool and centrifuged to separate a supernatant and a precipitate. In addition, after the supernatant was separated and collected, an isolation and purification operation was performed in the same manner as in the preliminary study, thereby obtaining a semiconductor nanoparticle composed of the In-added AgAuS multicomponent compound of the present embodiment.

[Variety of Studies of In-Added AgAuS Multicomponent Compound Nanoparticle]

Figure 5:
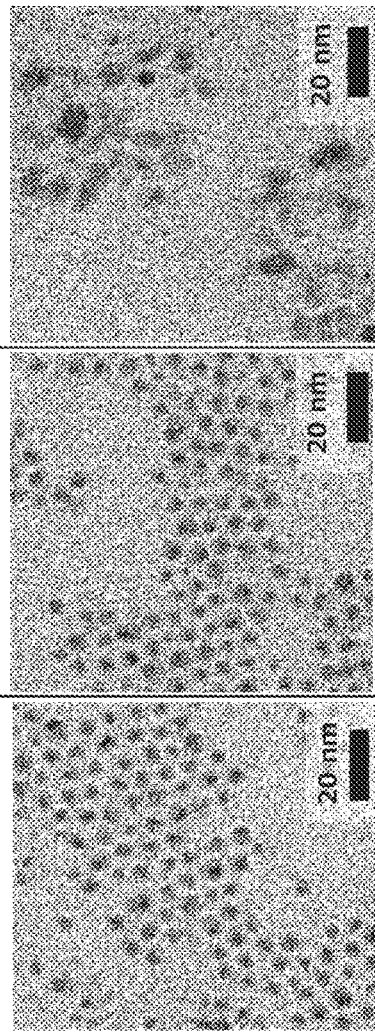
FIG. 5 is TEM images of In-added AgAuS-based multicomponent compound particles produced in First Embodiment.
Figure 5:
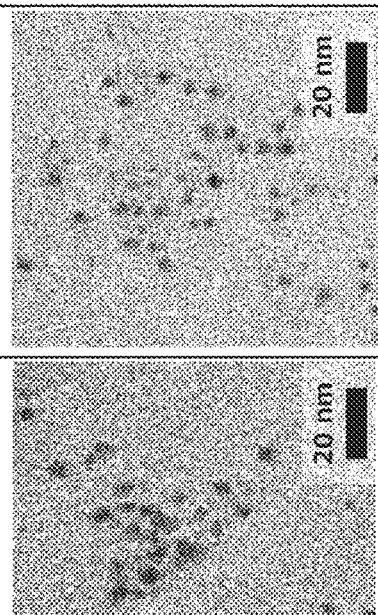
Figure 5:
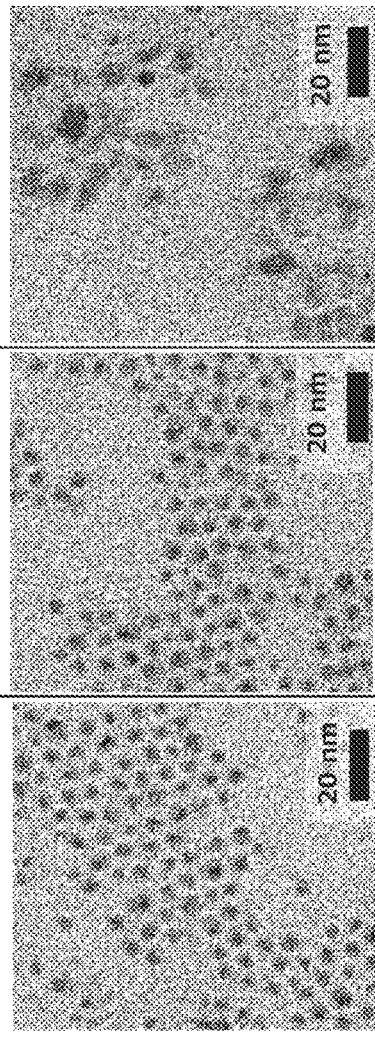
Figure 5:
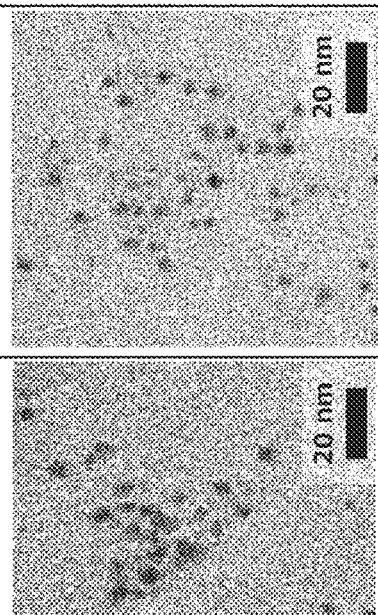
Figure 5:
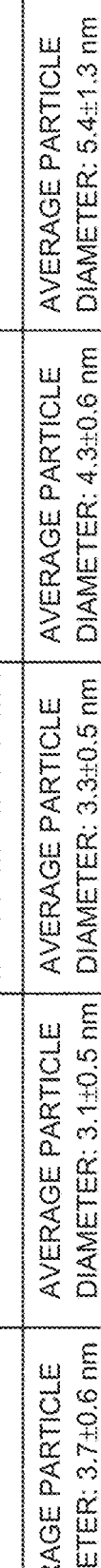

On the semiconductor nanoparticles composed of the In-added AgAuS multicomponent compounds produced above, TEM observation and composition analyses were performed in the same manner as in the preliminary study. A TEM image of each AgAuS-based multicomponent compound particle to which In was added is shown in FIG. 5, and the result of the composition analysis is shown in Table 3.

TABLE 3

| | Ag charged ratio (a) | Composition (at %) | | | | x/ (x + y) |
|---|---|---|---|---|---|---|
| | | Ag | Au | S | In | |
| Example 1 | 0.50 | 29.4 | 19.4 | 42.8 | 8.4 | 0.60 |
| Example 2 | 0.63 | 36.4 | 14.6 | 40.9 | 8.1 | 0.71 |
| Example 3 | 0.75 | 40.4 | 10.3 | 40.8 | 8.4 | 0.80 |
| Example 4 | 0.88 | 44.6 | 6.8 | 40.5 | 5.1 | 0.87 |
| Reference Example | 1.00 | 55.7 | 0.0 | 36.5 | 7.8 | 1.00 |

Figure 6:
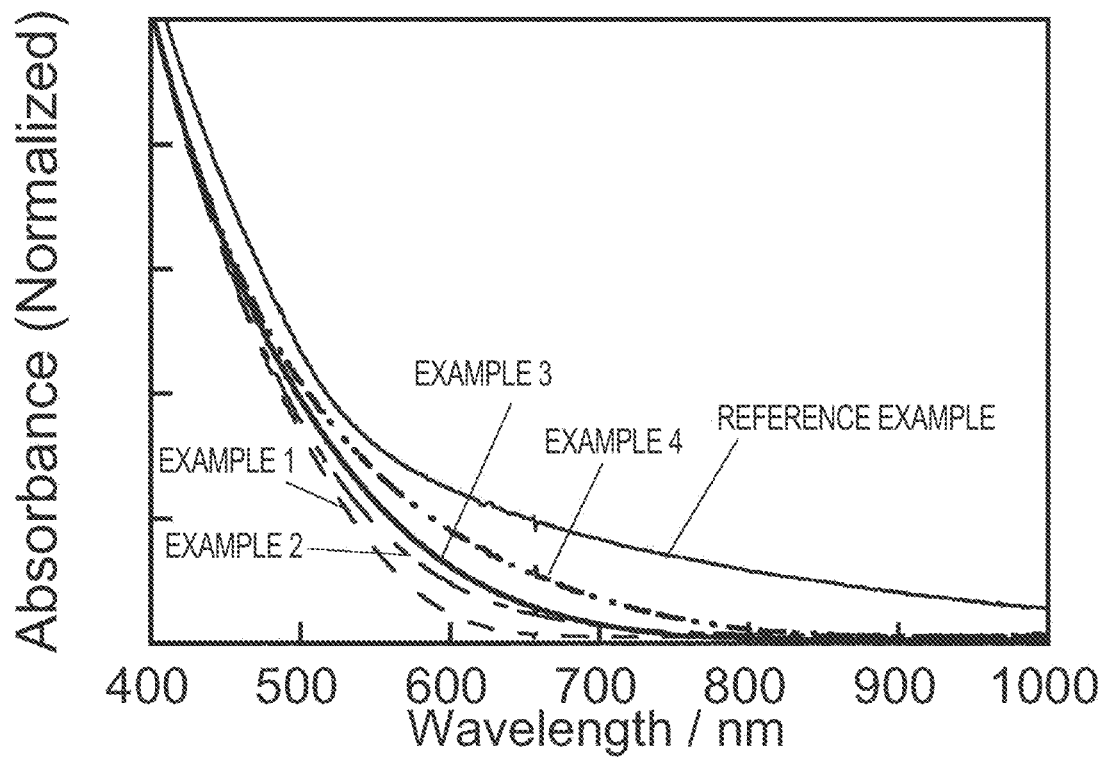
FIG. 6 is measurement results of absorption spectra of the In-added AgAuS-based multicomponent compound particles produced in First Embodiment.
Figure 7:
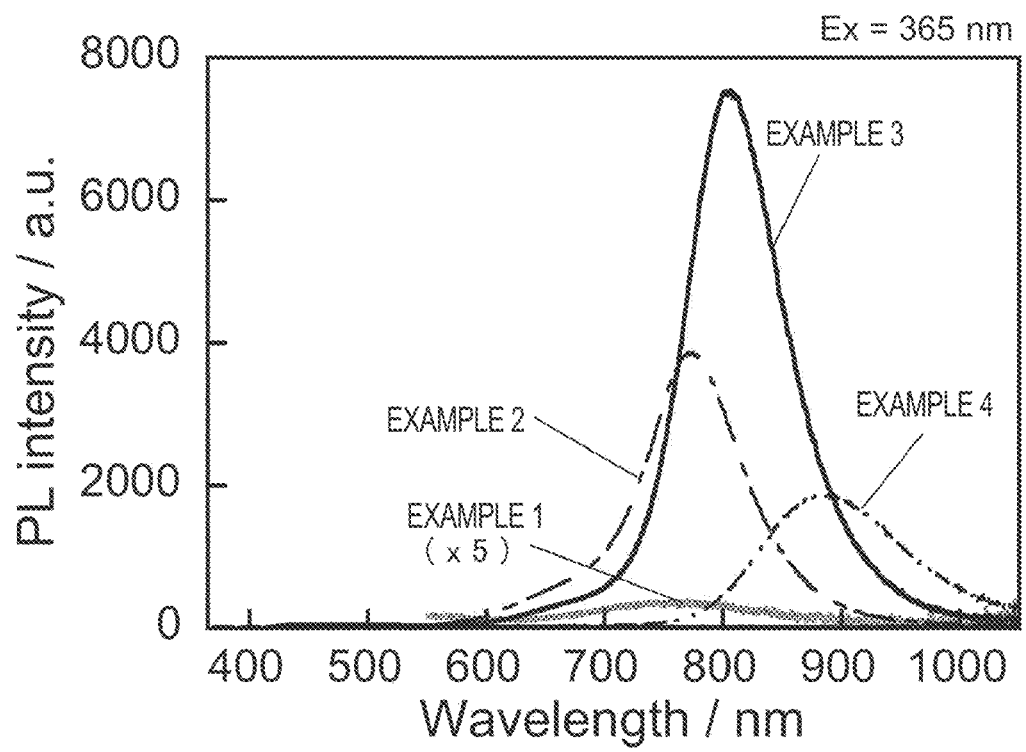
FIG. 7 is measurement results of emission spectra and emission quantum efficiencies of the In-added AgAuS-based multicomponent compound particles produced in First Embodiment.

In addition, on each semiconductor nanoparticle, an absorption spectrum, an emission spectrum and an emission quantum efficiency were measured. Methods for measuring these were the same as those in the above-described preliminary study. The measurement results of the absorption spectra of the semiconductor nanoparticles (Ag charged ratios: 0.5, 0.63, 0.75, 0.88 and 1.0) produced in the present embodiment are shown in FIG. 6, the measurement results of the emission spectra are shown in FIG. 7, and these are summarized and shown in Table 4.

TABLE 4

| | Ag charged ratio (a) | Composition (at %) | | | | x/ (x + y) | λ (nm) | PLQY (%) |
|---|---|---|---|---|---|---|---|---|
| | | Ag | Au | S | In | | | |
| Example 1 | 0.50 | 29.4 | 19.4 | 42.8 | 8.4 | 0.60 | 760 | 1.3 |
| Example 2 | 0.63 | 36.4 | 14.6 | 40.9 | 8.1 | 0.71 | 774 | 26.8 |
| Example 3 | 0.75 | 40.4 | 10.3 | 40.8 | 8.4 | 0.80 | 805 | 50.3 |
| Example 4 | 0.88 | 44.6 | 6.8 | 40.5 | 5.1 | 0.87 | 885 | 22.3 |
| Reference Example | 1.00 | 55.7 | 0.0 | 36.5 | 7.8 | 1.00 | — | 0 |

From Table 4, clear increases in the emission quantum efficiencies by the addition of the metal M (In) to the AgAuS ternary compounds were confirmed. In addition, shifts of the emission spectra of the AgAuS ternary compounds in the long wavelength direction by the addition of In were confirmed. In Example 1 where the Ag charged ratio was 0.5, the emission quantum efficiency did not increase, but a shift of the emission spectrum toward the long wavelengths was observed.

Second Embodiment: In the present embodiment, a relationship between the amount of In added to the AgAuS-based multicomponent compound nanoparticle and the optical semiconductor characteristics was studied. Here, In was added to a AgAuS ternary compound where the Ag charged ratio was 0.75. A method for adding In and reaction conditions were set in the same manner as in First Embodiment. Regarding the addition of In, indium chloride having the same number of atoms of In as the sum of the number of Ag atoms and the number of Au atoms in the nanoparticle ($1.23 \times 10^{-5}$ mol) was regarded as a standard (1 equivalent) in First Embodiment, and 0.25 equivalents ($3.08 \times 10^{-6}$ mol; Example 5), 0.5 equivalents ($6.15 \times 10^{-6}$ mol; Example 6), 2 equivalents ($2.46 \times 10^{-5}$ mol; Example 7) and 4 equivalents ($4.92 \times 10^{-5}$ mol; Example 8) of indium chloride were added. In addition, together with indium chloride, 0.25 equivalents ($4.06 \times 10^{-6}$ mol; Example 5), 0.5 equivalents ($9.20 \times 10^{-6}$ mol; Example 6), 2 equivalents ($3.68 \times 10^{-5}$ mol; Example 7) and 4 equivalents ($7.36 \times 10^{-5}$ mol; Example 8) of thioacetamide were added. These and the AgAuS ternary compound nanoparticle (the total metal amount of Ag and Au was $1.23 \times 10^{-5}$ mol) were reacted with each other, thereby producing AgAuS-based multicomponent compound nanoparticles.

Figure 8:
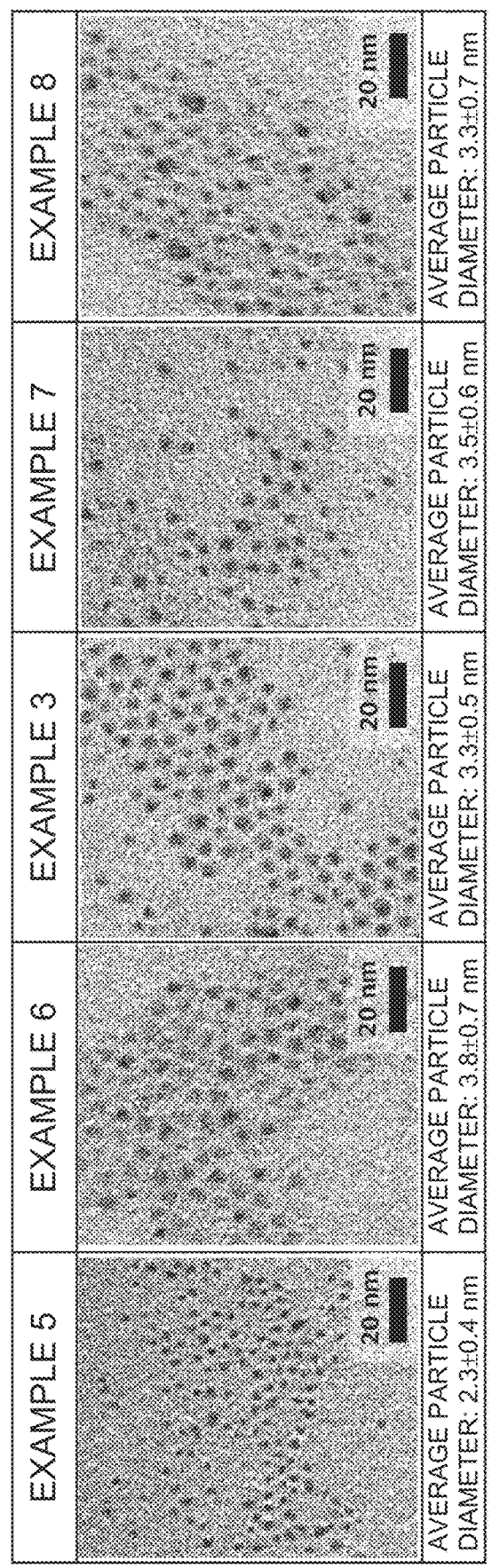
FIG. 8 is TEM images of In-added AgAuS-based multicomponent compound particles produced in Second Embodiment.

In addition, regarding each semiconductor nanoparticle to which In had been added in each amount added, TEM observation and a composition analysis (SEM-EDS) were performed in the same manner as in First Embodiment. A TEM image of each semiconductor nanoparticle is shown in FIG. 8. In addition, the result of the composition analysis of each semiconductor nanoparticle (amount of In added: 0.25 equivalents, 0.5 equivalents, 1 equivalent, 2 equivalents or 4 equivalents) is shown in Table 5.

TABLE 5

| | Amount In added | Composition (at %) | | | | |
|---|---|---|---|---|---|---|
| | | Ag | Au | S | In | x/(x + y) |
| Reference Example | 0 equivalents | 47.8 | 12.3 | 39.9 | 0.0 | 0.80 |
| Example 5 | 0.25 equivalents | 46.6 | 12.3 | 39.6 | 1.5 | 0.79 |
| Example 6 | 0.5 equivalents | 43.3 | 11.0 | 39.7 | 6.0 | 0.80 |
| Example 3 | 1 equivalents | 40.4 | 10.3 | 40.8 | 8.4 | 0.80 |
| Example 7 | 2 equivalents | 29.7 | 7.2 | 46.4 | 16.7 | 0.80 |
| Example 8 | 4 equivalents | 23.6 | 6.0 | 49.9 | 20.5 | 0.80 |

It is found from Table 5 that the content of In in the semiconductor nanoparticle increases as the amount of In added increases.

Next, in order to study the details of the configurations of the semiconductor nanoparticles, XRD analyses and observation with HAADF-STEM were performed on the nanoparticles in which the amount of In added was 0 equivalents, 1 equivalent, 2 equivalents and 4 equivalents (Reference Example and Examples 3, 7 and 8) An XRD analyzer was Ultima IV produced by Rigaku Corporation, CuKα rays were used as characteristic X rays, and 1°/min. was set as an analysis condition. A HAADF-STEM device was Tecnai Osiris produced by FEI Company, and as an analysis condition, the observation was performed at an accelerating voltage of 200 kV. In the HAADF-STEM observation, point analyses were performed with an EDX device attached to the device on the vicinity of the center and the vicinity of the surface layer of the nanoparticle. As the results of these analyses, the result of the XRD analysis of each semiconductor nanoparticle is shown in FIG. 9, and HAADF images and mapping images are shown in FIG. 10.

Figure 9:
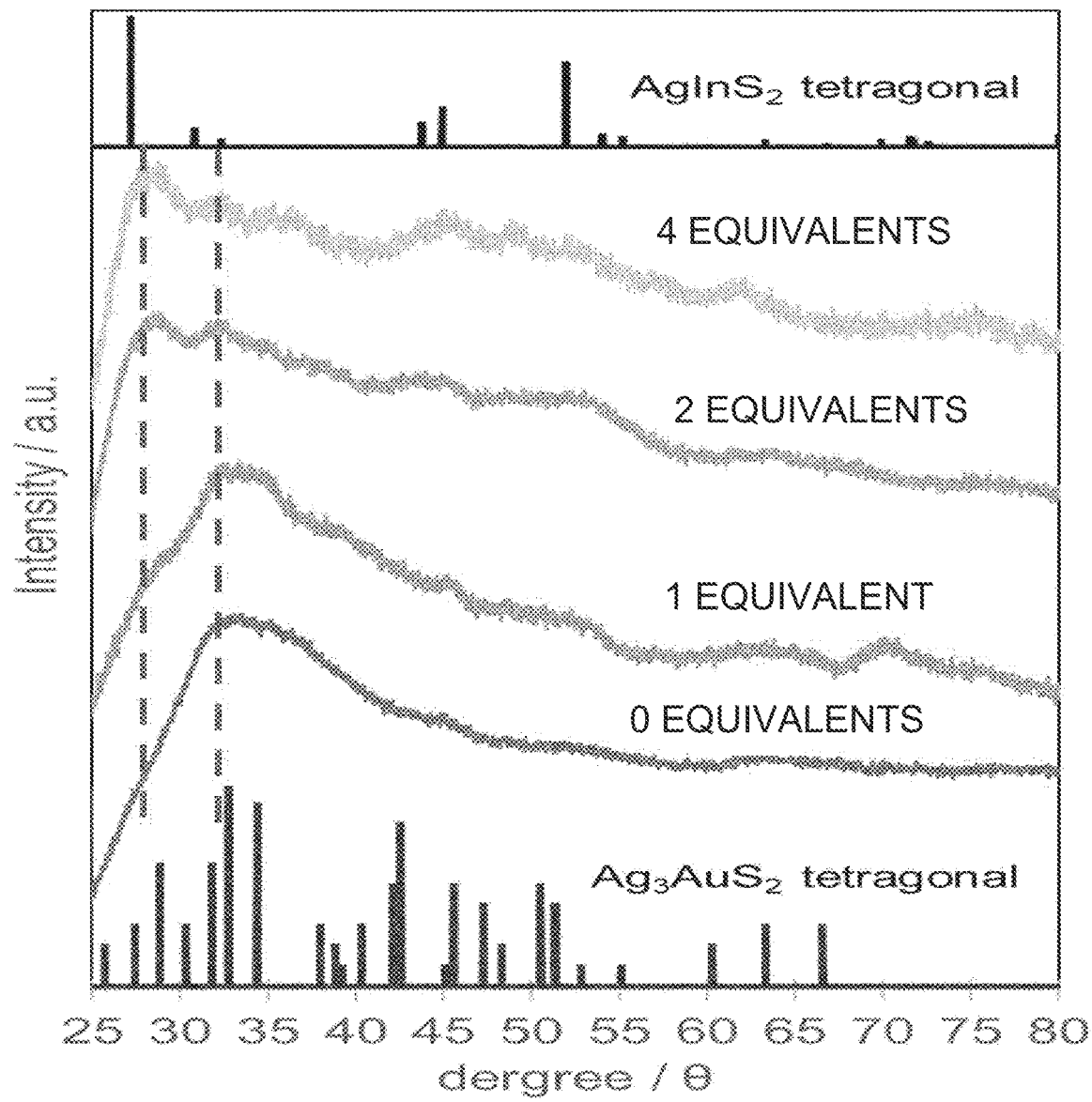
FIG. 9 is XRD diffraction profiles of the In-added AgAuS-based multicomponent compound particles produced in Second Embodiment.
Figure 10:
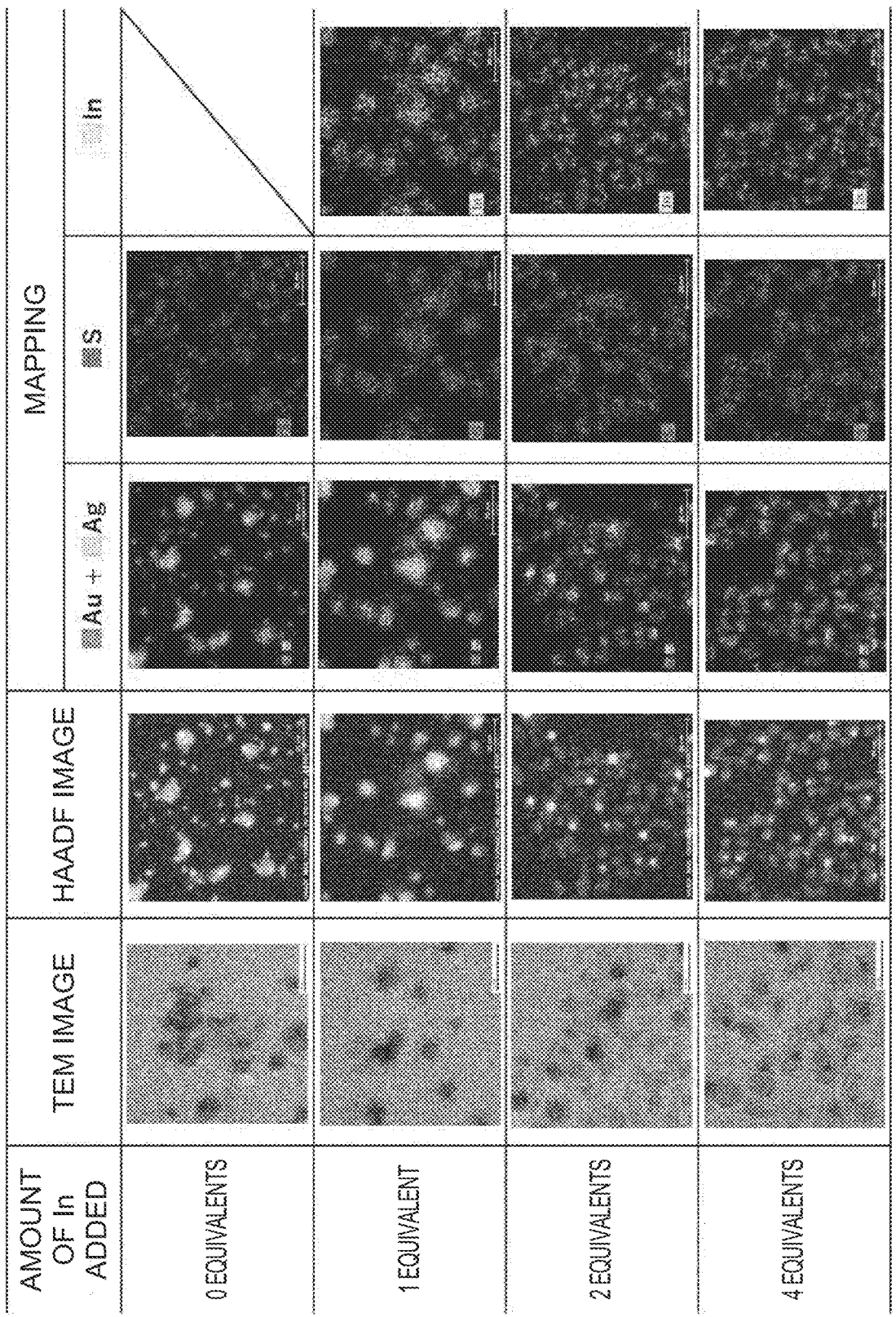
FIG. 10 is TEM images and HAADF images of the In-added AgAuS-based multicomponent compound particles produced in Second Embodiment.
Figure 11:
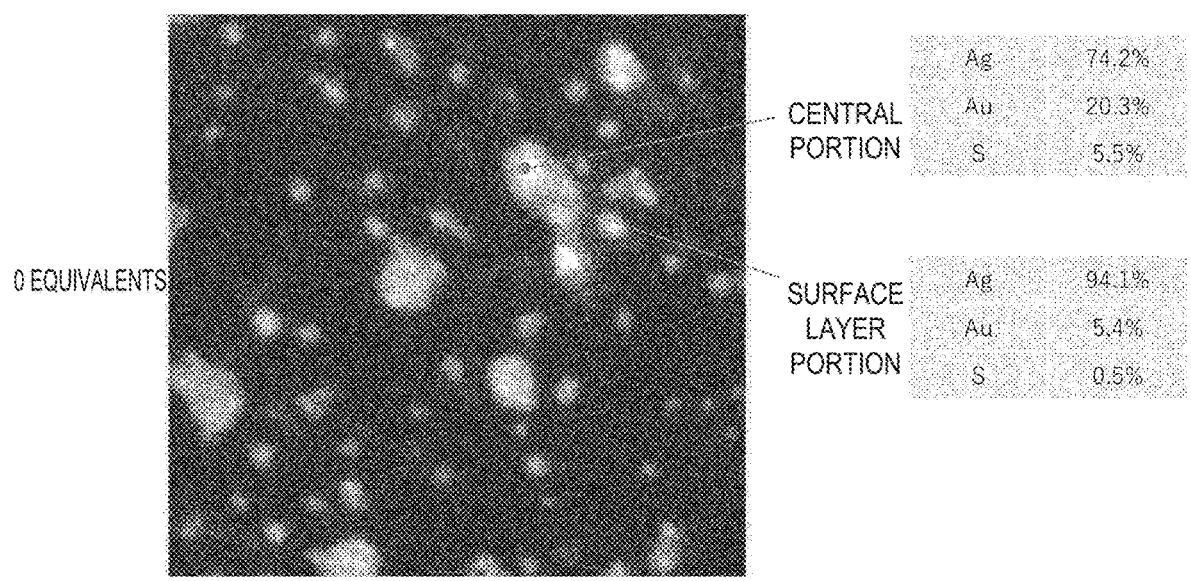
FIG. 11 is an example of the result of an EDX analysis of a vicinity of a center and a vicinity of a surface layer of a AgAuS ternary compound particle to which In is not added.
Figure 12:
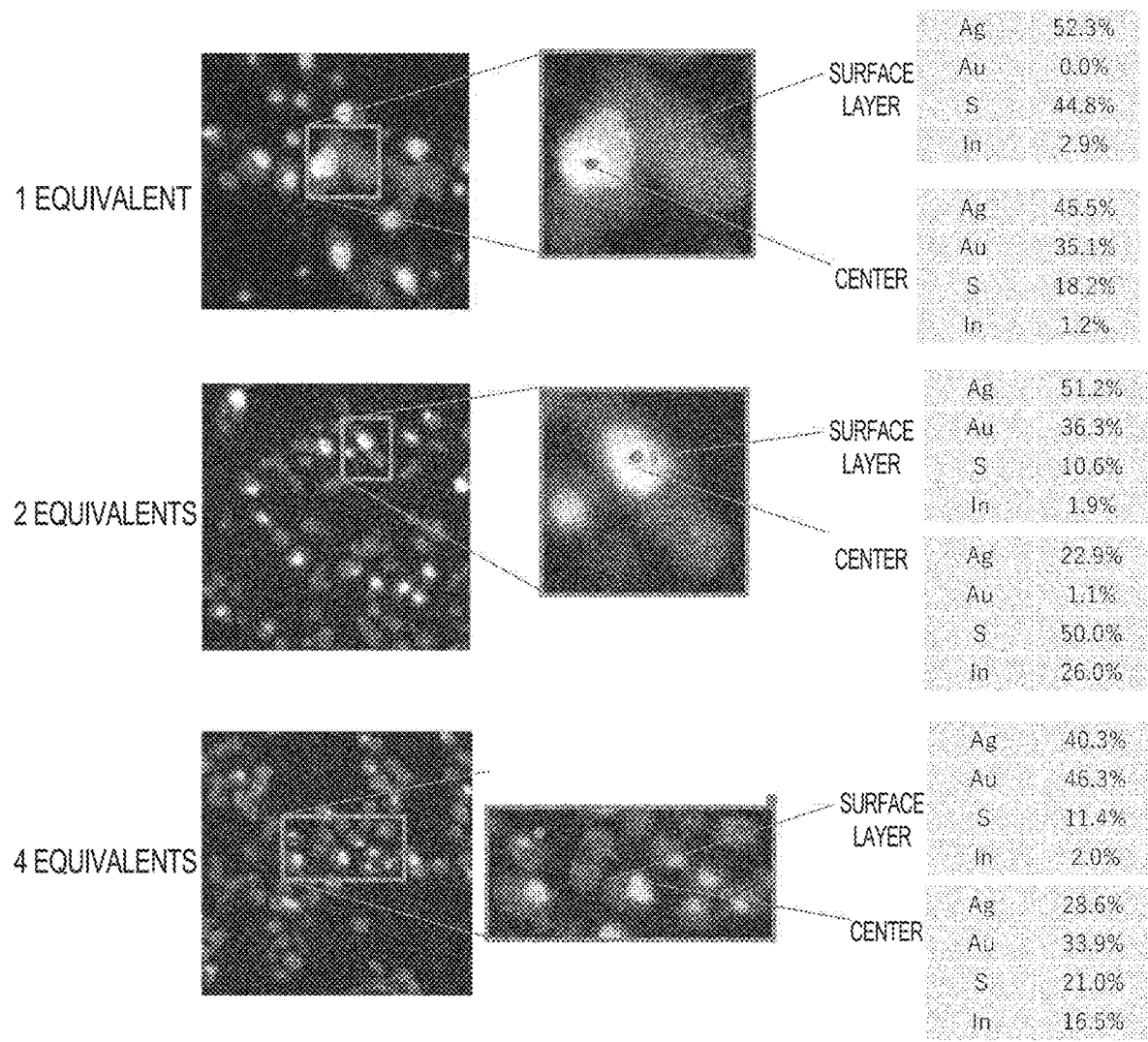
FIG. 12 is an example of the results of EDX analyses of a vicinity of a center and a vicinity of a surface layer of an In-added AgAuS-based multicomponent compound particle.

Referring to the results of the XRD analyses in FIG. 9, it is noted as the amount of In added becomes 2 equivalents and 4 equivalents, the diffraction peak of $AgInS_2$ in the vicinity of 27° increases. In addition, EDX point analyses were performed on the semiconductor nanoparticles observed with the HAADF-STEM, and examples of the results of performing the configuration ratio of each element in the vicinity of the center and in the vicinity of the surface layer are shown in FIGS. 11 and 12. Referring to the results of these EDX point analyses, it is considered that a AgAuS ternary compound particle to which In was not added (0 equivalents: Reference Example) contained Ag as a main component of the surface layer and had a core-shell structure in which the center was composed of the AgAuS ternary compound. This AgAuS ternary compound to which In was not added and the AgAuS-based multicomponent compound in which the amount of In added was 1 equivalent (Example 3) have similar configurations in the surface layer portions and contain no Au. In addition, it is confirmed that, as the amount of In added increases from 2 equivalents, Au in the surface layer portion increases.

Therefore, ICP analyses were performed to more strictly estimate the composition (element ratio) and structure of each semiconductor nanoparticle. The ICP analysis was performed using Agilent 5110 manufactured by Agilent Technologies International Japan, Ltd. as a measuring instrument by performing a pretreatment by a microwave acid digestion method and then performing measurement at a RF power of 1.2 KW, a plasma gas flow rate of 12 L/min. and an auxiliary gas flow rate of 1.0 L/min. The results of the composition analysis of each semiconductor nanoparticle by this ICP are shown in Table 6.

TABLE 6

| | Amount of In added | Composition (atomic ratio)[1] | | | |
|---|---|---|---|---|---|
| | | Ag | Au | S | In |
| Reference Example | 0 equivalents | 1.0 | 0.27 | 0.62 | 0.00 |
| Example 3 | 1 equivalents | 1.0 | 0.27 | 0.62 | 0.23 |
| Example 7 | 2 equivalents | 1.0 | 0.25 | 0.82 | 0.67 |
| Example 8 | 4 equivalents | 1.0 | 0.26 | 1.50 | 1.04 |

[1]Relative value for which the number of Ag atoms is regarded as 1.0.

In Table 6, regarding each nanoparticle, the composition is shown with ratios for which the number of atoms of Ag was regarded as 1.0. Table 6 shows that, when In was added to the AgAuS ternary compound particle, the S content rates of the AgAuS-based multicomponent compound particles in which the amounts of In added were 0 equivalents (In was not added) and 1 equivalent (Example 3 in First Embodiment), respectively, are almost the same. That is, it is considered that, until the addition of 1 equivalent, only In was added to the AgAuS ternary compound particle. In addition, it is considered that, as the amount of In added increases from 2 equivalents, the S content rate increases. When the results of FIGS. 11 and 12 above are collectively considered, it is assumed that, in the AgAuS-based multicomponent compound nanoparticles obtained by adding the metal M to the AgAuS ternary compound nanoparticle, there are cases where a structural change is caused due to the amount of the metal M added or the like. When the results of the evaluation of following optical semiconductor characteristics are taken into account, it is deemed that, regarding AgAuS-based multicomponent nanoparticles, there is no need to interpret a preferable structure in a limited manner.

[Measurement of Optical Semiconductor Characteristics of AgAuS-Based Multicomponent Compound]

After the above-described analyses were performed, regarding each semiconductor nanoparticle, the absorption spectrum, the emission spectrum and the emission quantum efficiency were measured in the same manner as in First Embodiment. These results are shown in FIG. 13, FIG. 14 and Table 7.

TABLE 7

| | Amount of In added | Composition (at %) | | | | x/(x + y) | λ (nm) | PLQY (%) |
| --- | --- | --- | --- | --- | --- | --- | --- | --- |
| | | Ag | Au | S | In | | | |
| Reference Example | 0 equivalents | 47.8 | 12.3 | 39.9 | — | 0.80 | 778 | 4.2 |
| Example 5 | 0.25 equivalents | 46.6 | 12.3 | 39.6 | 1.5 | 0.79 | 794 | 7.7 |
| Example 6 | 0.5 equivalents | 43.3 | 11.0 | 39.7 | 6.0 | 0.80 | 814 | 24.0 |
| Example 3 | 1 equivalents | 40.4 | 10.3 | 40.8 | 8.4 | 0.80 | 805 | 50.3 |
| Example 7 | 2 equivalents | 29.7 | 7.2 | 46.4 | 16.7 | 0.80 | 770 | 41.1 |
| Example 8 | 4 equivalents | 23.6 | 6.0 | 49.9 | 20.5 | 0.80 | 760 | 14.5 |

Figure 13:
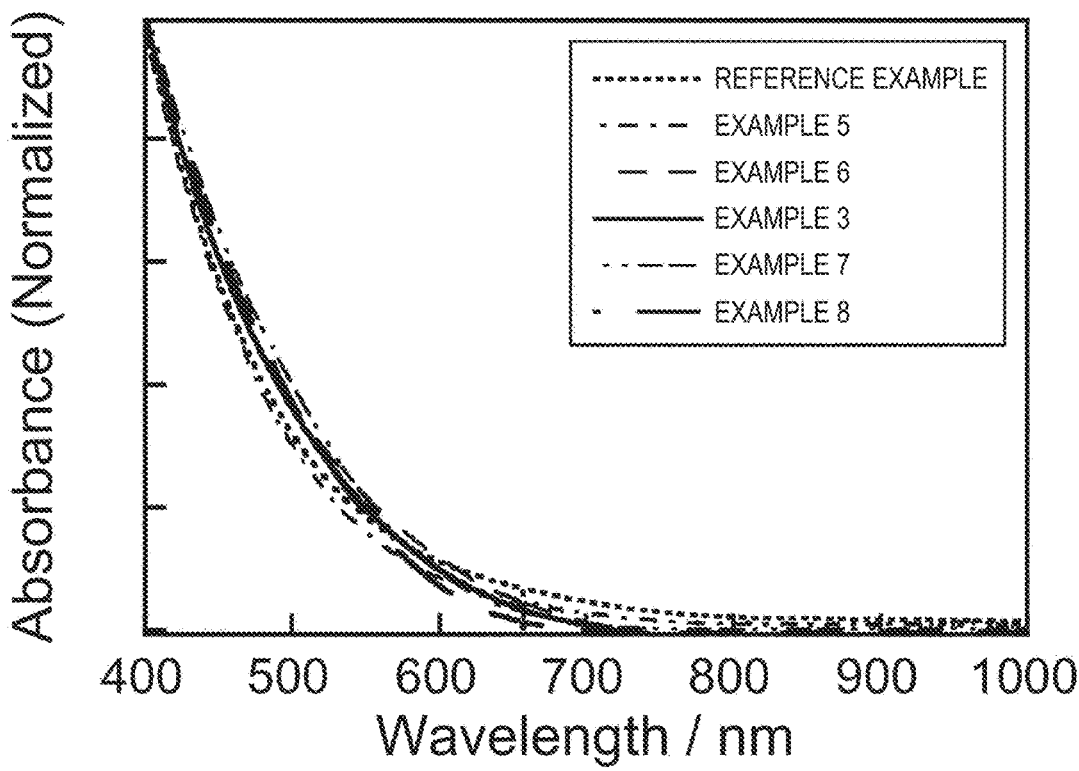
FIG. 13 is measurement results of absorption spectra of the In-added AgAuS-based multicomponent compound particles produced in Second Embodiment.
Figure 14:
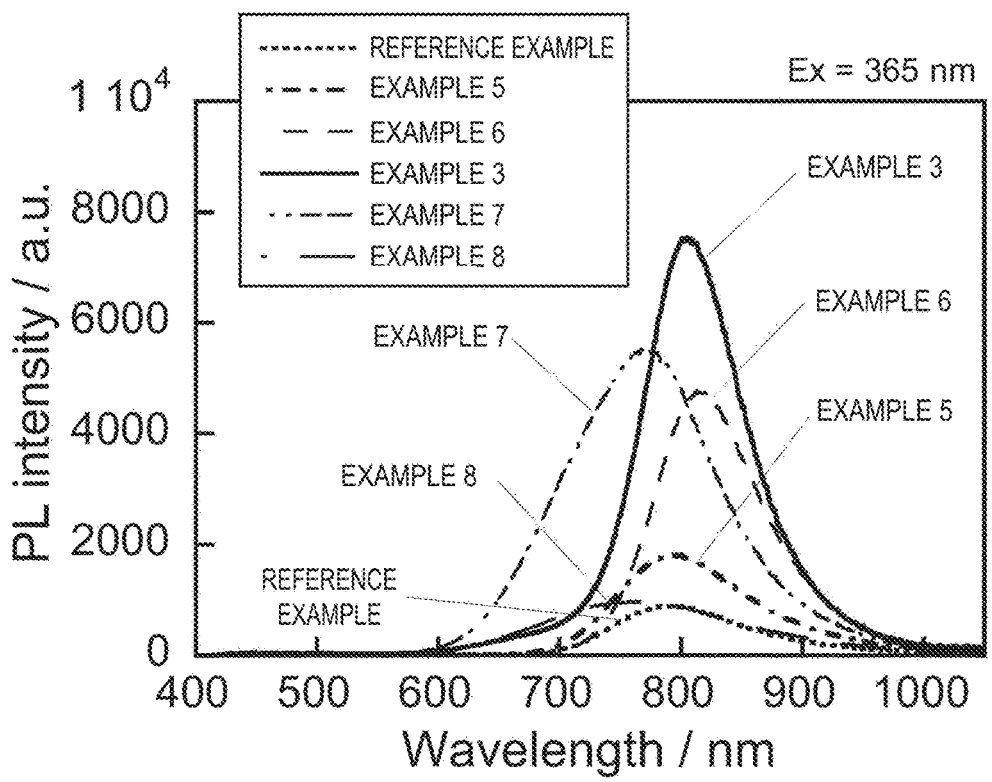
FIG. 14 is measurement results of emission spectra and emission quantum efficiencies of the In-added AgAuS-based multicomponent compound particles produced in Second Embodiment.

FIG. 13 shows that there is no significant differences in the absorption spectra of the In-added AgAuS-based multicomponent compound nanoparticles due to the amount of In added. Referring to FIG. 14, the emission quantum efficiency exhibits the maximum value in the particle in which the amount of In added was 1 equivalent (First Embodiment). The emission quantum efficiency decreases as the amount of In added increases, but is the same as that of the AgAuS ternary compound particle to which In was not added. In addition, the emission spectra show that, in the particle in which the amount of In added was 1 equivalent, the peak was shifted in the long wavelength direction with respect to the AgAuS ternary compound particle to which In was not added, but the peak was shifted in the short wavelength direction with 2 equivalents and 4 equivalents. The decreases in the emission quantum efficiencies or the peak shifts toward the lower wavelengths of the emission spectra of these AgAuS-based multicomponent compound nanoparticles in which the amount of In added exceeded 1 equivalent are considered to arise from the advancement of the generation of the above-described $AgInS_2$.

Third Embodiment: In the present embodiment, AgAuS-based multicomponent compound nanoparticles were produced with Cu added to a AgAuS ternary compound particle. Cu was added to the AgAuS ternary compound in which the Ag charged ratio was 0.75 in First Embodiment.

Regarding the addition of Cu, CuCl (copper chloride) was used as a Cu source, and copper chloride and thioacetamide were added to the AgAuS ternary compound particle in a solvent basically in the same manner as in First Embodiment. Regarding the amount of Cu added to the AgAuS ternary compound nanoparticle (the total metal amount of Ag and Au was 1.23× $10^{-5}$ mol), copper chloride having the same number of atoms of Cu as the sum of the number of Ag atoms and the number of Au atoms in the nanoparticle (1.23×$10^{-5}$ mol) was regarded as a standard (1 equivalent), and the AgAuS ternary compound particle was reacted with 2 equivalents (2.46×$10^{-5}$ mol) and 3 equivalents (3.69×$10^{-5}$ mol) of copper chloride. In addition, in these reactions, together with copper chloride, 1 equivalent (6.15×$10^{-6}$ mol), 2 equivalents (12.3× $10^{-6}$ mol) and 3 equivalents (18.45× $10^{-6}$ mol) of thioacetamide were added. Reaction conditions were set in the same manner as in First Embodiment.

Figure 15:
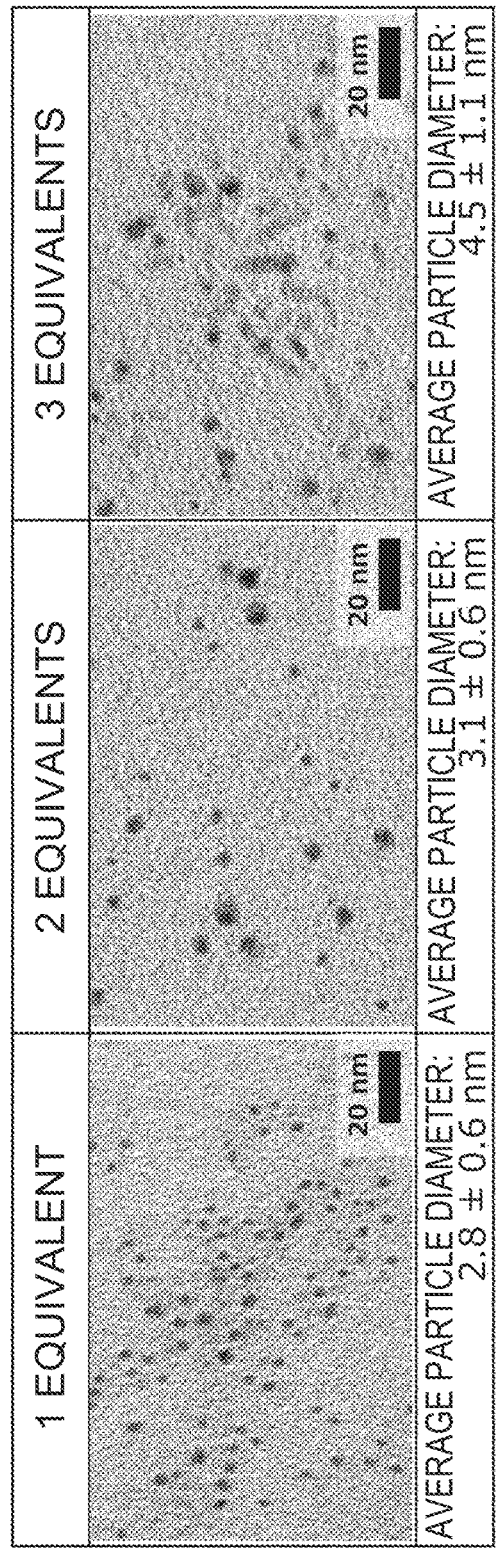
FIG. 15 is TEM images of Cu-added AgAuS-based multicomponent compound nanoparticles produced in Third Embodiment.
Figure 16:
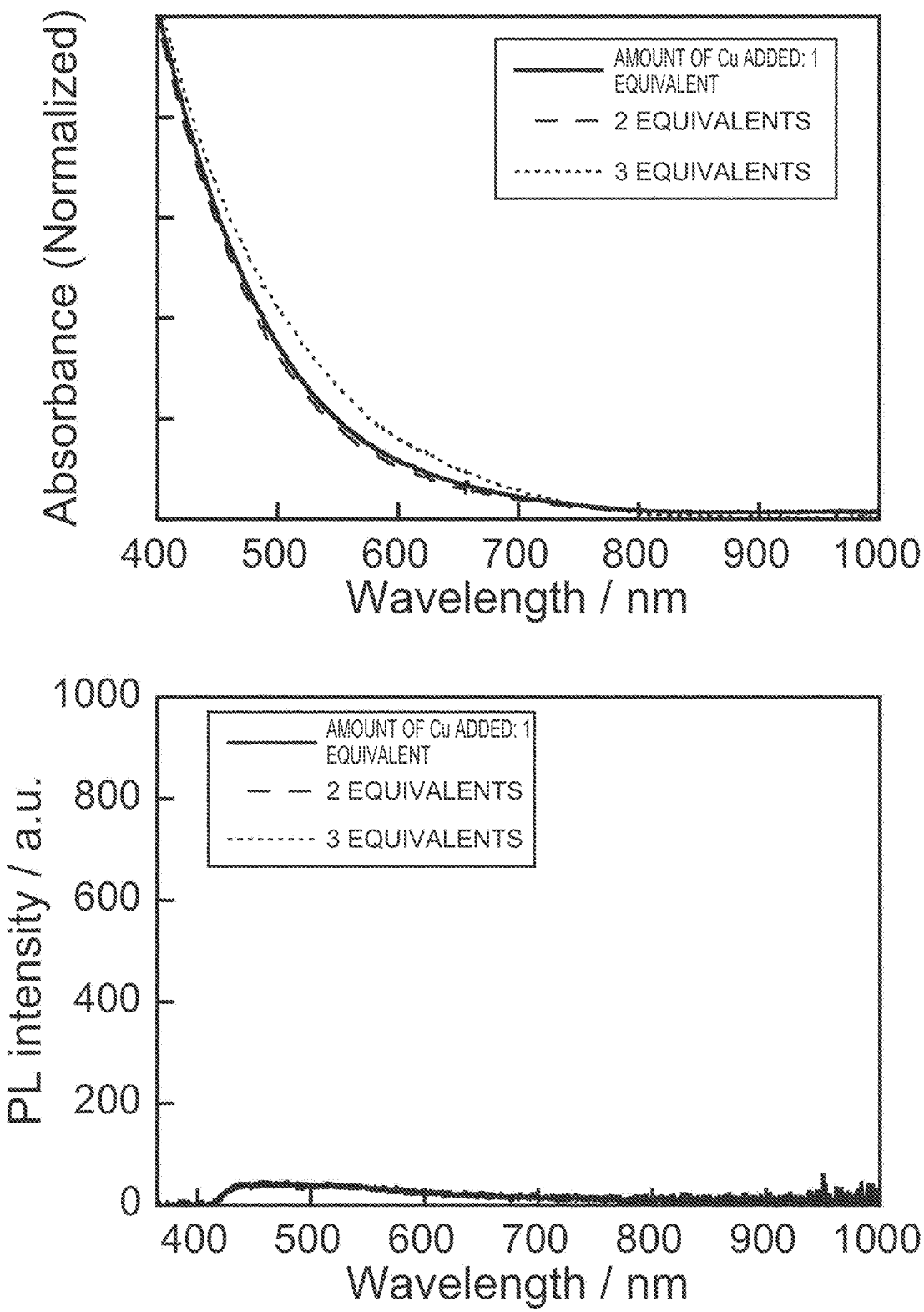
FIG. 16 is measurement results of absorption spectra and emission spectra of the Cu-added AgAuS-based multicomponent compounds produced in Third Embodiment.

In addition, regarding the produced Cu-added AgAuS-based multicomponent compound nanoparticles, TEM observation and composition analyses were performed, and the absorption spectra and the emission spectra were then measured. The TEM observation results of the Cu-added AgAuS-based multicomponent compound nanoparticles of the present embodiment are shown in FIG. 15, and the results of the composition analyses are shown in Table 8. In addition, the measurement results of the absorption spectra and the emission spectra are shown in FIG. 16.

TABLE 8

| Amount of Cu added | Composition (at %) | | | | x/(x + y) |
| --- | --- | --- | --- | --- | --- |
| | Ag | Au | S | Cu | |
| 0 equivalents | 47.8 | 12.3 | 39.9 | 0.0 | 0.80 |
| 1 equivalents | 46.1 | 12.1 | 38.6 | 3.2 | 0.79 |
| 2 equivalents | 42.9 | 11.2 | 38.7 | 7.2 | 0.79 |
| 3 equivalents | 43.1 | 10.9 | 34.8 | 11.2 | 0.80 |

From the Cu-added AgAuS-based multicomponent compound nanoparticles as well, it was observed increases in the Cu concentration in association with the increases in the amounts added. In addition, from the measurement results of the absorption spectra, it is confirmed that there are no significant changes in the absorption edge wavelengths, but changes in the spectrum shapes caused by the addition of Cu are observed, from which a possibility of characteristic adjustment by the addition of Cu is confirmed. From the Cu-added AgAuS-based multicomponent compound nanoparticles, no emission was confirmed.

Fourth Embodiment: In the present embodiment, AgAuS-based multicomponent compound nanoparticles were produced with Zn added to a AgAuS ternary compound particle. Zn was added to the AgAuS ternary compound in which the Ag charged ratio was 0.75 in First Embodiment.

Regarding the addition of Zn, $Zn(C_{18}H_{35}O_2)_2$ (zinc stearate) was used as a Cu source, and zinc stearate and thioacetamide were added to the AgAuS ternary compound particle in a solvent basically in the same manner as in First Embodiment. Regarding the amount of Zn added, 0.5×$10^{-7}$ mol (particle) of the AgAuS ternary compound nanoparticle, 0.035 mmol of zinc stearate and 0.035 mmol of thioacetamide were reacted with one another such that a 1 nm-thick shell was formed on the surface of the AgAuS ternary compound particle. As reaction conditions, the components were heated at a temperature of 100° C. for one hour.

Figure 17:
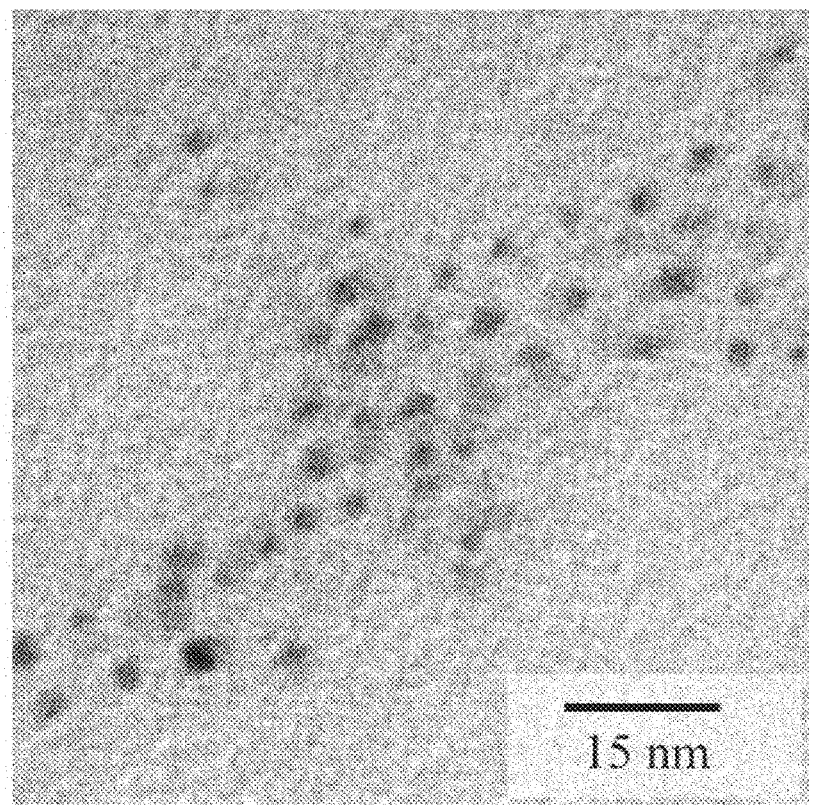
FIG. 17 is TEM images of Zn-added AgAuS-based multicomponent compound nanoparticles produced in Fourth Embodiment.
Figure 18:
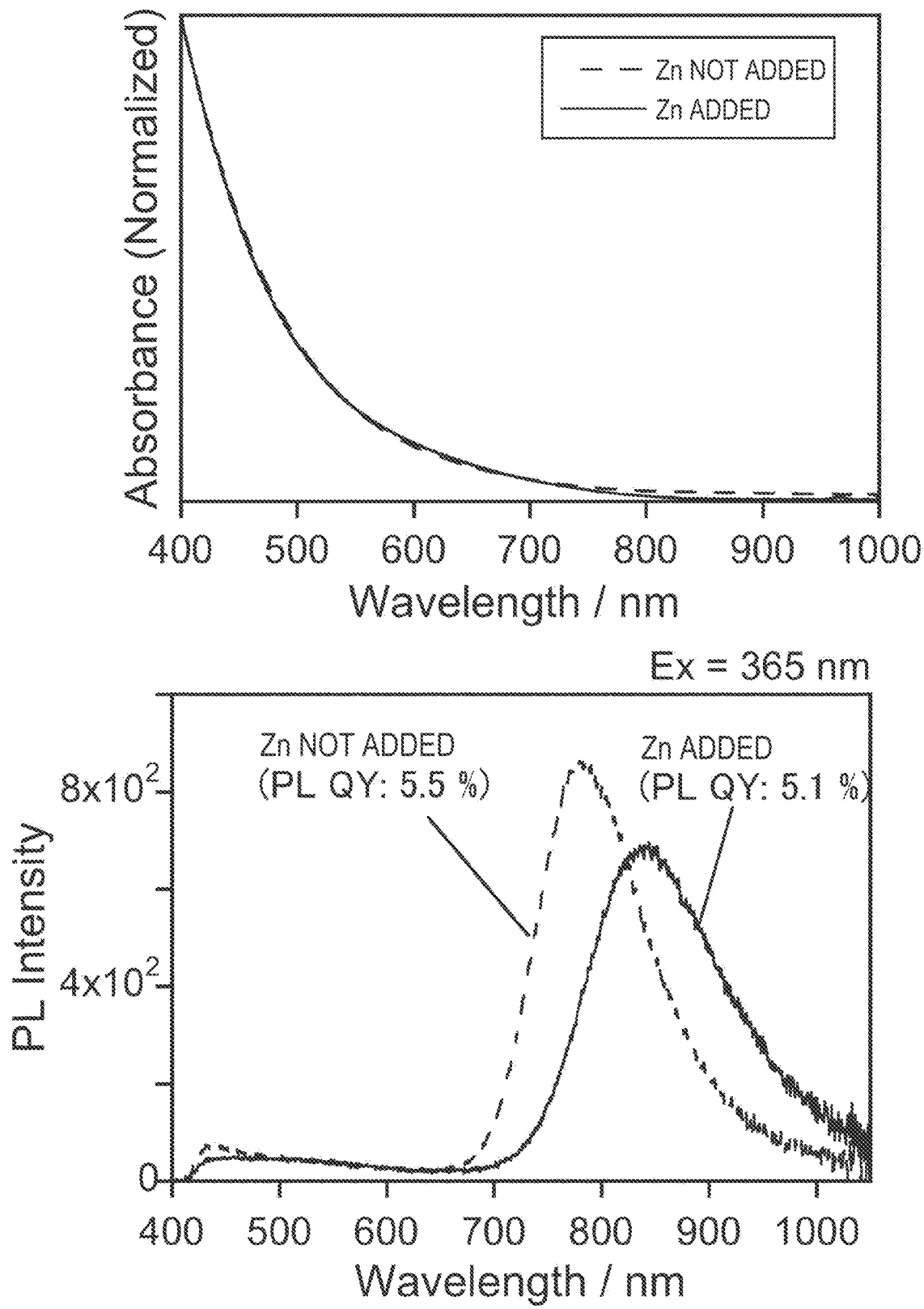
FIG. 18 is measurement results of absorption spectra and emission spectra of the Zn-added AgAuS-based multicomponent compounds produced in Fourth Embodiment.

Regarding the AgAuS-based multicomponent compound nanoparticles produced in the present embodiment, TEM observation and composition analyses were performed, and the absorption spectra and the emission spectra were then measured. The TEM observation results of the AgAuS-based multicomponent compound nanoparticles of the present embodiment are shown in FIG. 17, and the results of the composition analyses are shown in Table 9. In addition, the measurement results of the absorption spectra and the emission spectra are shown in FIG. 18.

TABLE 9

| Zn addition | Composition (at %) | | | | x/(x + y) |
|---|---|---|---|---|---|
| | Ag | Au | S | Zn | |
| No | 47.8 | 12.3 | 39.9 | 0.0 | 0.80 |
| Yes | 19.9 | 5.7 | 39.7 | 34.7 | 0.78 |

From the Zn-added AgAuS-based multicomponent compound nanoparticles of the present embodiment, emission was confirmed, but the emission quantum efficiencies were almost the same as those of the AgAuS ternary compound particles before the addition. From the Zn-added AgAuS-based multicomponent compound nanoparticles, however, peak shifts of the emission spectra in the long wavelength direction were confirmed, and a possibility of adjustment of emission characteristic was confirmed.

INDUSTRIAL APPLICABILITY

As described above, the semiconductor nanoparticle composed of the novel AgAuS-based multicomponent compound of the present invention is capable of exhibiting favorable optical semiconductor characteristics. In addition, this AgAuS-based multicomponent compound is a low-toxic biocompatible compound. Accordingly, the semiconductor nanoparticle of the present invention is expected to be applied to light-emitting elements and fluorescent substances that are used for display devices, marker substances for detecting bio-related substances and the like or photoelectric conversion elements or light-receiving elements, which are mounted in solar cells, light sensors and the like.

In addition, the semiconductor nanoparticle of the present invention is aimed at improving light-emitting and light-absorptive characteristics in the near-infrared range. This fact makes the present invention also useful for light receiving elements adapted for LIDAR or SWIR image sensors for which responsiveness in the near-infrared range has been emphasized among the above-described photoelectric conversion elements.

What is claimed is:

1. A semiconductor nanoparticle comprising:
a compound containing Ag, Au, S and a metal M as essential constitutional elements,
wherein the metal M is at least any of Al, Ga, In, Tl, Zn, Cd, Hg and Cu,
the compound has a total content of Ag, Au, S and the metal M of 95 mass % or more, and
a ratio (x/(x+y)) of the number of atoms of Ag to a sum of the number of atoms of Ag, x, and the number of atoms of Au, y, in the compound is 0.60 or more and 0.88 or less.

2. The semiconductor nanoparticle according to claim 1, wherein a content of the metal M in the compound is 1 at % or more and 40 at % or less.

3. The semiconductor nanoparticle according to claim 1, wherein a content of S in the compound is 30 at % or more and 60 at % or less.

4. The semiconductor nanoparticle according to claim 1, wherein the compound is one containing Ag, Au and S in which the metal M is doped.

5. A semiconductor nanoparticle comprising:
a compound containing Ag, Au, S and a metal M as essential constitutional elements,
wherein the compound comprises:
a core compound containing Ag, Au and S;
a shell compound that coats at least a part of a surface of the core compound and contains the metal M and/or essentially contains the metal M and contains at least any of Ag, Au and S, and
a ratio (x/(x+y)) of the number of atoms of Ag to a sum of the number of atoms of Ag, x, and the number of atoms of Au, y, in the compound is 0.60 or more and 0.88 or less.

6. The semiconductor nanoparticle according to claim 1, having an average particle diameter of 2 nm or more and 20 nm or less.

7. The semiconductor nanoparticle according to claim 1, having at least any of an alkylamine having 4 to 20 carbon atoms in an alkyl chain, an alkenylamine having 4 to 20 carbon atoms in an alkenyl chain, an alkylcarboxylic acid having 3 to 20 carbon atoms in an alkyl chain, an alkenylcarboxylic acid having 3 to 20 carbon atoms in an alkenyl chain, an alkanethiol having 4 to 20 carbon atoms in an alkyl chain, a trialkylphosphine having 4 to 20 carbon atoms in an alkyl chain, a trialkylphosphine oxide having 4 to 20 carbon atoms in an alkyl chain, triphenylphosphine and triphenylphosphine oxide as a protective agent bonded to a surface thereof.

8. The semiconductor nanoparticle according to claim 1, wherein a long wavelength-side absorption edge wavelength of an absorption spectrum is 600 nm or higher.

9. The semiconductor nanoparticle according to claim 2, wherein a content of S in the compound is 30 at % or more and 60 at % or less.

10. The semiconductor nanoparticle according to claim 2, wherein the compound is one containing Ag, Au and S in which the metal M is doped.

11. The semiconductor nanoparticle according to claim 3, wherein the compound is one containing Ag, Au and S in which the metal M is doped.

12. The semiconductor nanoparticle according to claim 2, wherein the compound comprises
a core compound containing Ag, Au and S; and
a shell compound that coats at least a part of a surface of the core compound and contains the metal M and/or essentially contains the metal M and contains at least any of Ag, Au and S.

13. The semiconductor nanoparticle according to claim 3, wherein the compound comprises
a core compound containing Ag, Au and S; and
a shell compound that coats at least a part of a surface of the core compound and contains the metal M and/or essentially contains the metal M and contains at least any of Ag, Au and S.

14. The semiconductor nanoparticle according to claim 2, having an average particle diameter of 2 nm or more and 20 nm or less.

* * * * *